(12) United States Patent
Poisel et al.

(10) Patent No.: US 7,010,191 B2
(45) Date of Patent: Mar. 7, 2006

(54) OPTICAL ROTATING DATA TRANSMISSION DEVICE HAVING AN UNOBSTRUCTED INNER DIAMETER

(75) Inventors: Hans Poisel, Leinburg (DE); Markus Stark, Waizendorf (DE); Harry Schilling, Eichstätt (DE); Matthias Rank, Wilmering (DE); Günther Schoppel, Weisendorf (DE)

(73) Assignee: Schleifring und Apparatebau GmbH, Fürstenfeldbruck (DE)

( * ) Notice: Subject to any disclaimer, the term of this patent is extended or adjusted under 35 U.S.C. 154(b) by 0 days.

(21) Appl. No.: 10/918,321

(22) Filed: Aug. 13, 2004

(65) Prior Publication Data

US 2005/0063709 A1     Mar. 24, 2005

Related U.S. Application Data

(63) Continuation of application No. PCT/DE03/00438, filed on Feb. 13, 2003.

(30) Foreign Application Priority Data

| Feb. 15, 2002 | (DE) | ................ 102 06 589 |
| Feb. 15, 2002 | (DE) | ................ 102 06 591 |
| Oct. 1, 2002 | (DE) | ................ 102 46 141 |
| Dec. 3, 2002 | (DE) | ................ 102 56 634 |
| Jun. 1, 2004 | (DE) | ........ 10 2004 026 945 |
| Aug. 2, 2004 | (DE) | ........ 10 2004 037 684 |

(51) Int. Cl.
*G02B 6/26* (2006.01)
(52) U.S. Cl. .................... 385/25; 385/26
(58) Field of Classification Search ......... 385/25, 385/26

See application file for complete search history.

(56) References Cited

U.S. PATENT DOCUMENTS

| 4,109,997 | A | | 8/1978 | Iverson ..................... 385/26 |
| 4,525,025 | A | | 6/1985 | Hohmann et al. ......... 385/26 |
| 4,555,631 | A | | 11/1985 | Martens ................... 250/551 |
| 4,872,737 | A | * | 10/1989 | Fukahori et al. ........... 385/25 |
| 4,934,783 | A | | 6/1990 | Jacobson .................. 385/25 |

(Continued)

FOREIGN PATENT DOCUMENTS

DE         195 43 386         3/1997

OTHER PUBLICATIONS

International Search Report, PCT/DE2003/000438, mailed Nov. 11, 2003.

*Primary Examiner*—John D. Lee
(74) *Attorney, Agent, or Firm*—Kevin L. Daffer; Daffer McDaniel, LLP

(57) ABSTRACT

In a device of the invention for transmitting modulated optical signals between a first unit and a second unit, the first unit is supported to be rotatable relative to the second unit. The device comprises a light guide along a circular track on the first unit, a first light coupler for coupling light into or out of the light guide, and a second light coupler for coupling light into or out of the light guide and disposed on the second unit and movable relative to the means for guiding light. For an achievement of a high quality of transmission, a regulating means for the position of the coupling elements relative to the light guide, or a hydrodynamic bearing means is provided. An optical light-guiding fiber of the invention for conveying optical signals from an optical transmitter to an optical receiver has a light exit face and means for deflecting light emerging from the fiber in a direction that deviates from a longitudinal axis of the fiber.

60 Claims, 18 Drawing Sheets

U.S. PATENT DOCUMENTS

| | | | |
|---|---|---|---|
| 4,962,986 A | 10/1990 | Hompel et al. | 398/141 |
| 5,134,639 A | 7/1992 | Vekstein et al. | 378/15 |
| 6,104,849 A | 8/2000 | Lewis et al. | 385/26 |
| 2002/0015469 A1 | 2/2002 | Matsuyama et al. | 378/15 |

* cited by examiner

OPTICAL ROTATING DATA TRANSMISSION DEVICE HAVING AN UNOBSTRUCTED INNER DIAMETER

This application is a continuation of International Application No. PCT/DE03/00438 filed on Feb. 13, 2003, which designates the United States and claims priority to German Application Nos. 10246141.4 filed Oct. 1, 2002; 10206589.6 filed Feb. 15, 2002; 10206591.8 filed Feb. 15, 2002; and 10256634.8 filed Dec. 3, 2002. In addition, this application claims priority to German Application Nos. 102004026945.9 filed Jun. 1, 2004 and 102004037684.0 filed Aug. 2, 2004.

TECHNICAL FIELD

The invention relates to a device for transmitting optical signals between units that are rotatable relative to each other. Devices of this kind are preferably employed in computer tomographs. Furthermore the invention relates to an optical sensor.

PRIOR ART

For transmitting optical signals between units that are rotatable relative to each other, various devices, having in particular an unobstructed inner diameter, are known. A basic problem here is that of designing a means for passing light along the periphery of the device, and suitable means for coupling in and coupling out light. For use in computer tomographs, devices of this kind must have large unobstructed inner diameters of an order of magnitude of 1 meter. During the rotation, a circumferential speed may be of an order magnitude of 20 m/s. At the same time, data rates of more than 1 gigabits per second (GBaud) must be possible.

Thus, U.S. Pat. No. 4,109,997 discloses an optical rotating data transmission system in which light is conveyed along the circumference by reflection at two opposite surfaces. Light guides or glass fibers are provided for coupling light in or out, a bundling or focusing of light rays being achieved by means of lenses. However, this device has a series of disadvantages. Thus, an attenuation of optical transmission caused by multiple reflections at relatively large angles is comparatively high. Therefore high transmission power of the optical transmitter is required. Furthermore, fabrication costs are relatively high, because of the oppositely located mirror surfaces. Broadband data transmission with modulation signal period lengths substantially shorter than the transit time of the signal around the circumference of the device is not possible, because at positions of the receiver close to the transmitter, a multiple-path reception of signals occurs. Thus, signals received from the transmitter along a short path and also signals reflected at least once around the circumference of the device are received simultaneously. The difference of transit time must be small compared with the length of a period of the modulation signal. Thus, an inner diameter of about one meter results in a total transit time of about 10 nanoseconds around the circumference. With this, for example, in transmitting digital signals, bit durations of maximally 50 nanoseconds, corresponding to a maximum transmission rate of 20 Mbaud, can be achieved.

An improvement of the optical system is disclosed in U.S. Pat. No. 4,525,025. This shows, especially in FIG. 10, a particularly suitable trench for transmitting optical signals. This consists of only one single component part and therefore can be manufactured at low cost. However, this patent specification also describes no effective solution of the problem of bandwidth limitation. Furthermore, the suggested coupling in or coupling out of light by means of blunt fiber ends can be put into practice only with extremely poor efficiency. Thus, this device is suitable only for small diameters.

An improvement of the optical coupling in or coupling out is disclosed in the U.S. Pat. No. 4,555,631. In this, a coupling in of optical signals is effected in a mirror-coated cylinder by means of two mirrors. For coupling out, an additional coupling-out element is disposed at a fixed position in the trench. However, here too a high attenuation along the optical transmission path results, because the coupling-in mirrors cannot be positioned as closely as desired to the mirror-coated cylinder. Furthermore, an unavoidable fanning-out of the light beam on the plane mirror surface results in an additional deterioration of the efficiency. Moreover, the mechanical construction of the coupling-out element involves special outlay, and is therefore subject to failure, and costly. Finally, the problem of band-width limitation also is not solved. Thus, the light is passed from the coupling-in position to the coupling-out position in opposite directions along two paths, and is finally evaluated jointly in a receiver. Here too, the limitation applies that the duration of the period of the modulation signal must be substantially smaller than the transit time of the light around the circumference of the device.

A device having a particularly high optical efficiency is described in the U.S. Pat. No. 4,934,783. In this, a focusing of a beam is achieved with a lens system. However, this system involves very high outlay, is expensive to manufacture, and is only suitable for small diameters. Furthermore, here too the bandwidth problem is unsolved.

In order to reduce the attenuation by the transmission path and to increase the transmittable bandwidth, transmission along a plurality of shortened segments is proposed in U.S. Pat. No. 6,104,849. Reduced attenuation is achieved by means of the shortened segments. Here, the maximum bandwidth is inversely proportional to the length of the segments. Thus, a higher bandwidth is achieved with shorter segments. With this, however, a correspondingly larger number of optical transmitters and receivers is needed to cover the full circular circumference. Thus, the costs of the system increase in proportion to the bandwidth.

German Patent DE 195 43 386 C1, although describing a device for wideband signal transmission that makes possible a high bandwidth, provides no indication of any transmission with high transmission quality. The contents of DE 195 43 386 C1 are incorporated by reference in the present document.

The U.S. Pat. No. 4,962,986 describes an alternative device for light coupling. For coupling light into or out of light-guiding fibers, a coupling medium having a higher refractive index than the surroundings is positioned to directly contact a fiber core. With this, a deflection of the light carried in the fiber into the coupling medium occurs. This arrangement has the decisive disadvantage that the coupling medium must be directly in contact with the fiber core. Thus, this system may be exclusively employed for coupling at given fixed positions. However, this kind of system is hardly usable for arrangements in which the transmitter and the receiver move relative to each other, because here the coupling medium must slide with high velocity along a fiber core which is usually very thin and sensitive.

A device of this kind is described in Tamir, "Integrated Optics," published by Springer Verlag, Berlin, 1979, page 87. In this, a prism serving for decoupling is positioned at a distance which is as small as possible above the fiber core. In order to achieve a reasonable degree of coupling efficiency here, the distance between the prism and the fiber core must be of the same order of magnitude as the wavelength of light. However, with conventional highly precise bearings, this accuracy can be achieved only with small dimensions of the entire arrangement. Thus, at present this system cannot be employed, for example, in computer tomographs having a diameter of 1.5 meters and circumferential speeds of up to 20 m/s.

DESCRIPTION OF THE INVENTION

The invention is based on the object of designing a device of relatively low cost for transmitting optical signals between two units which are rotatable relative to each other, so that a reliable transmission with low optical attenuation is made possible for large diameters, high mechanical movement speeds, and high data rates. Furthermore, it is the object of a special development of the invention to design the device so that even signals having period lengths which are small in comparison with the time of the propagation of the light around the circumference of the device may be transmitted.

A further object of the invention is that of further developing a fiber-optical sensor as known in the art so that it is adapted to perform measurements laterally of the fiber. Furthermore, this fiber-optical sensor is required to be of small constructional size and inexpensive, and therefore capable of being built without any additional separate optical components for beam deflection.

According to the present invention the first object is achieved by a device for transmitting modulated optical signals between a first unit and a second unit, the first unit being supported to rotate relative to the second unit, comprising a light guide along a circular track on the first unit; at least one first light coupler connected to the light guide for coupling light into or out of the light guide; at least one second light coupler disposed on the second unit and movable relative to the light guide, for coupling light into or out of the light guide; wherein at least one second light coupler has an actuator and associated therewith at least one sensor and a control unit for adjusting the position of the light coupler, at least one sensor being provided for determining the position of the light coupler, signals of which are communicated to the control unit, and wherein the control unit generates corresponding control signals for the actuator, so that the position of the light coupler along at least one axis, preferably along two axes perpendicular to the tangent of the rotary movement of the two units relative to the light guide, is maintained at a given value.

The device in accordance with the invention comprises a light guide disposed along a circular track on a first unit. For simplification, only one light guide is described here. Of course, a plurality of arrangements according to the invention, each having one light guide, may also be disposed in parallel. Connected to the light guide is at least one first light coupler for coupling light into or out of the light guide. Connected to at least one of these first light couplers is at least one optical transmitter or receiver. Whether a transmitter or a receiver is to be connected to the light guide is determined by the desired direction of transmission. If light is to be transmitted away from the light guide, then a transmitter is provided, and in the other case, a receiver. For transmission of information, the optical transmitters can of course be modulated with a modulation signal.

Furthermore, a second unit supported to be rotatable relative to the first unit is provided. Here the two units will be regarded as performing a relative movement with respect to each other, and no reference is made to rotating or fixed units, because this is merely a question of positional reference. To this second unit is assigned at least one second light coupler that moves with the rotation of the second unit relative to the first along a given track with respect to the light guide. At least one of these second light couplers is equipped selectively with an optical transmitter or receiver, in a manner complementary to that of the first light coupler.

The invention provides for at least one second light coupler to have an active position regulating unit. This position regulating unit comprises an actuator for accurately positioning the light coupler, and also a sensor for determining the position of the light coupler with reference to the light guide, and a control unit for evaluating the sensor signals and the corresponding control of the actuator. A regulation of the position of the light coupler is made along at least one axis, but preferably along two axes perpendicular to the tangent to the rotary movement. With this, selectively the height of the light coupler above the light guide, or the lateral spacing between light coupler and light guide is maintained at a constant value. By means of this regulation of position it becomes possible for the first time to couple in light at extremely flat angles, i.e. almost parallel to the tangent to the light guide, in order to make possible a quasi-parallel propagation of the light to the mirror trench in a so-called "whispering gallery mode". Optionally, the regulation of position may also involve a rotational or a tilt axis. Thus, particularly an alignment of a coupled-in light ray parallel to the tangent of the light guide has an extremely large effect on the coupling attenuation. The smallest of deviations from parallelism of the axes of the light guide and the light coupler may result in an interruption of the signal when the light coupler has no means for lateral reflection. In such a case, a regulation of the parallelism is of particular advantage. Such regulation of position is especially necessary with large diameters of the two units rotatable relative to each other, as employed, for example, in computer tomographs, in order to compensate for mechanical fabrication tolerances and also for tolerances resulting from the mechanical movement. With this regulation of position, a substantially constant attenuation can be achieved along the track. Alternatively, or in addition to this, a regulation of the constancy of received signal amplitude can also be provided. Thus, for example, a lateral positioning onto the center of the light guide can be achieved with a first regulating circuit. A second regulating circuit would then perform a positioning of height according to the received signal amplitude, wherein an additional safety monitoring would avoid a collision between light coupler and light guide.

Instead of an electrical actuator, such as for example a magnetic or piezoelectric actuator, other actuators, for example pneumatic or hydraulic actuators are conceivable. In the same way, sensors or elements of the regulating circuit may be designed to be pneumatic or hydraulic in addition to electric.

Another variety of the invention provides hydrostatic or hydrodynamic bearing means. With this, at least one second light coupler is positioned with respect to the light guide along one or two axes by means of a hydrostatic or hydrodynamic bearing.

A hydrostatic or hydrodynamic bearing of this kind is based on a thin gas film or liquid film, preferably an air film between two plane surfaces. The film is of high rigidity, so that large changes of force lead to only minor changes of spacing.

In the case of a gas film, preferably an inert gas such as nitrogen, or more preferably a noble gas, is used. The film-forming material or the gas is preferably transparent or not absorbing at the wavelength used for the optical transmission. With this, a penetration of the medium into the light guide causes no interference with the transmission. In the same way, the medium may be introduced into the light guide intentionally, for example to keep it free from external contamination, or to clean it.

Further suitable media are also liquids which pass over into a gaseous state at the operating temperature of the device. With these, simultaneous cooling of the system is possible, even under difficult conditions.

In the case of a hydrostatic bearing means, the bearing is preferably fed by means of a small pump or a pressurized gas container. Here the medium is urged between the two plane bearing faces. As such bearings consume only smallest amounts of gas or air owing to the small spacing and the high surface finish of the bearing faces, the feeding can be performed using low-cost means.

As an alternative to this, in the case of a hydrodynamic bearing means, feeding may be performed by means of an air stream caused by the movement of the two units with respect to each other. In this case, the bearing function is effected by means of the stream (hydrodynamic paradoxon, Bernoulli effect). For this, means are preferably provided for guiding the air stream, caused by the movement, between the bearing faces. In the simplest case, the air guiding elements consist of a simple air guide plate for deflecting a part of the air streams in suitable manner. In the same way, more complex embodiments are conceivable, which may, for example, additionally contain filters for freeing the air stream from large or small, but interfering particles. Optionally arrangements also may be chosen which, for example, provide for the speed of the air to be is substantially independent of the speed of movement. Thus, an independence of the air stream speed at increasing speed of movement may be achieved by means of an element providing for an increasing turbulence of the air. For the case of low speeds, a bearing of this kind must, of course, have emergency running properties. These may be achieved, for example, by means of an additional combination with a hydrostatic embodiment.

A combination of hydrodynamic or hydrostatic bearing means with an active regulation of the bearing means is of particular advantage. This may be applied, for example, for particularly precise alignment along the same axis, or also in supplementary manner, along different axes. Thus, for example, a regulation of the bearing means may be made by controlling the air stream or air pressure in a hydrodynamic or hydrostatic bearing means. This combination results in a mechanically robust system that is also provided with high precision properties by means of the additional superimposed regulation. With this, in particular, compensation may be made for tolerances of the spacing of the air bearing resulting from fluctuations of temperature and humidity of the air, and also fluctuations of the speed.

In a further advantageous embodiment of the invention, the sensor is designed to be an optical sensor. Thus, for example, it may be adapted to measure the size of a light source image having a minimum size at the focus corresponding to the optimum distance. Methods of this kind are used, for example, for focusing in CD playback instruments.

In a further advantageous embodiment of the invention, the sensor is selectively designed to be a capacitive or an inductive sensor. For this, the sensor is preferably designed to be a differential sensor for evaluating a difference between two signals.

A further advantageous embodiment of the invention provides a reference track parallel to the light guide. This reference track is used by the sensor for determining an exact position of the light guide, and as a measuring signal for regulating a second light coupler.

In a further advantageous embodiment of the invention, the actuator is designed to be an electromagnetic suspension of at least one second light coupler. An electromagnetic suspension of this kind supports or positions a light coupler in at least one axis, but optionally also in two axes. Preferably, the coupler element is incorporated in an electromagnetic suspension. This incorporation makes it possible to achieve an extremely compact structural component. Furthermore, this makes the movable mass become particularly small, so that regulation at a high speed becomes possible. In an advantageous manner, the actuator moves only one movable component of the light coupler, so that, for example, a light guide that is present for supplying light need not also be moved. This means, for example, that the entire light coupler in the form of a collimator, or only one single lens of the light coupler, may be moved.

In another advantageous embodiment of the invention, the light guide is divided into at least two segments, means being provided for an optical isolation of the segments from each other. An optical isolation may be made, for example, with absorbing materials disposed between the segments, or by deflection of the light between the segments, for example by means of mirrors, gratings or scattering materials, or also by means of a directional separation of the optical signals.

In addition, the lengths of the segments and also the directions of propagation of the light in the segments are so dimensioned that at boundaries between any two segments in which the same signal is being transmitted, the modulation signal will exhibit only minor differences of transit time or phase. These differences are intended to be small in comparison with the duration of a period of the modulation signal. Thus, the total signal transit times of a signal from the optical transmitter to the optical receiver will also exhibit only minor differences at the boundaries of the segments. This is necessary for ensuring broadband signal transmission. For a transmission to be free from interference throughout the entire rotational range of 360 degrees, the above-mentioned conditions must apply to all connecting positions between two adjacent segments.

Of course, with a device according to the invention, a plurality of signals may also be transmitted simultaneously. It is only necessary for the above-mentioned condition to be satisfied for each one of these signals. The relationship between different signals may be as desired.

The isolation (absorber) between a plurality of segments may also be designed to be a decoupling position of poor reflectivity. Here a monitoring receiver, for example, can be disposed for monitoring the transmission signal amplitude. This isolation may also be designed to be independent of wavelength. Preferably it is designed to be a thin sheet.

In a further advantageous embodiment of the invention, groups are provided, each consisting of two adjacent light guides of equal length and opposite directions of propagation of the light. In the simplest case, the entire arrangement, as described above, comprises only one single such group. However, in the same way a plurality of such groups may be disposed along the circumference of the circle. They also may each have different segment lengths, as long as both segments of a group have the same length. Thus, for example, different segment lengths may be provided for reasons of design for simplifying the mounting of different segment lengths. The subdivision into a plurality of segments also offers the advantage that data may be transmitted in each segment independently from the adjacent segments. This means that a correspondingly higher total data rate can be achieved. If, for example, an arrangement of four groups is provided along an entire circle circumference, then the total data rate may be increased many times by means of a simultaneous transmission of four signals.

For this, the light guide is advantageously subdivided into an even number of segments. The even number of segments permits the arrangement to be put into practice particularly easily because of the symmetry. A particularly cost-advantageous design can be obtained with two segments. In order to achieve a constant transit time at the segment boundaries with two segments, these must be of the same length and also have opposite directions of propagation of the light. In the case of two segments, the absorber is disposed at a position located 180 degrees from, i.e. opposite to, the coupling-in position. In the case of light being coupled into the first unit, this means that the absorber is displaced by 180° around the rotation axis of the two units. In the case of light being coupled into the second unit (and transmitted from there into the first unit), an absorber is employed to follow the rotational movement of the second unit relative to the mirror trench. This absorber too may be maintained in a desired position, for example by regulation of its bearing, or with hydrostatic or hydrodynamic bearing means, as has been described for the second light coupler.

In a further advantageous embodiment of the invention, at least one second light coupler, comprising a light-guiding fiber, is provided. The end of this fiber has a face serving to deflect laterally the light guided in the light-guiding fiber. By means of a deflection at this face, the light can be deflected at an angle at which it can continue to be guided in the light guide. Of course, with this embodiment a coupling of the light guided in the light guide into the optical fiber is also possible, because of the reciprocity of the optical system. For further optimization, the fiber optionally may be fitted to the contour of the light guide. With this, light may be coupled in on a light guide surface which is as large as possible. To deflect the light, the surface can be adapted for deflection by total reflection based on different refractive indices; but it can also be rendered reflective or contain a diffraction grating.

A further advantageous development of the invention consists in the light-guiding fiber being disposed to be approximately perpendicular to the tangent to the light guide. Furthermore, the angle of reflection of the issuing light advantageously extends almost tangentially to the light guide.

Furthermore, the light-guiding fiber may be used at the same time as an optical sensor. For this, preferably further faces are provided for deflecting the sensor signals in the direction of the contour of the light guide. By means of this incorporation, the number of needed components can be reduced. Furthermore, mechanical adjustment is simplified, because the effort-consuming precise adjustment of two components with respect to each other becomes unnecessary.

In another embodiment, at least one further face is adapted so that it permits sensor signals to be deflected or filtered selectively with respect to wavelength. Because of this selectivity of wavelengths, a selection of the various directions may be achieved in a simple manner.

According to a further advantageous development of the invention, at least one second light coupler is provided for coupling evanescent fields with each other. By means of a coupling of evanescent fields, a non-contacting coupling into or out of the light guide at short ranges is possible.

A second light guide for coupling evanescent fields with each other is preferably designed as a prism. For this coupling, a prism of this kind can then be guided preferably at a distance of the order of magnitude of one half of a wavelength, i.e. a few millimeters or nanometers, above the light guide.

In another embodiment of the invention the light guide has at least one boundary face, preferably having reflective properties. By means of reflection on at least one of such boundary faces, concerted guiding of the light along the preferably circular contour of the light guide is possible.

In another embodiment of the invention, the light guide comprises at least one material having a mirror surface. Thus, it may be designed to be a trench in a metallic support having a mirror-finish-surface. A finishing treatment for obtaining a mirror-finish-surface may be made, for example, with diamond tools.

In a further embodiment of the invention, the light guide comprises at least one material having a mirror-finish-surface. Thus, an additional layer having mirror-like properties is coated onto the light guide. Layers of this kind may be deposited, for example, by electroplating, or vapor deposition in a vacuum. Particularly well-suited as a coating material is gold, because it has a very high constant of reflection at a wavelength of 13 micrometers, for which optical components are on the market at low cost. With this, furthermore, an extremely corrosion-resistant coating of the surface can be obtained.

In an improved embodiment of the invention, the reflective surface is obtained optionally by means of a reflecting or reflectively coated foil. Foils of this kind can be inexpensively manufactured and affixed in a simple manner to chosen supports, for example of plastics or metal. As an alternative to this, a reflecting layer may be deposited by electroplating or vacuum deposition to render the surface reflecting. Particularly high degrees of reflection may be achieved with coatings of this kind.

A further advantageous embodiment of the invention is distinguished by the surface having a system of multiple interference layers. With this, in advantageous manner, a selective wavelength dependent reflection may be achieved. Thus, with this means, a light guide of the invention may be designed so that it preferably transmits the wavelengths used for signal transmission, but no stray light from the surroundings. A particularly high suppression of undesired light may be achieved here, particularly in open light guides. Furthermore, in the case of a transmission of a plurality of channels having different wavelengths, a selective wavelength-dependent reflection may be achieved.

Another embodiment of the invention provides for the surface to have a protective layer. A protective layer of this kind may, for example, prevent or retard contamination or even chemical change, such as oxidation. This protective layer is preferably designed so that it impairs the reflecting properties of the reflecting layers lying underneath as little as possible, and also causes as small as possible an attenuation of the light to be transmitted.

A further advantageous embodiment of the invention provides for the light guide to have, at least on one side, a boundary surface to air, in which a wave similar to a film wave or surface wave may be guided. A wave of this kind spreads out in the boundary layer of the light guide to the surrounding medium and can be coupled in or out from the outside by means of a coupler. In advantageous manner a prism is employed for coupling.

In another embodiment of the invention, an optical grating is fitted to the light guide for coupling out light. Optical gratings of this kind can be incorporated particularly easily and in a space-saving manner. With a grating of this kind, an isolation between the various segments may be simultaneously achieved, when for example it guides the light at the boundaries out of the light guide. Furthermore, these gratings may be designed to be wavelength selective, so that different wavelengths may be decoupled at different places. With this, a multi-channel signal transmission may be achieved in a wavelength multiplex operation within smallest space.

A further embodiment of the invention provides a Fresnel structure for coupling out light at the light guide. Structures of this kind can be achieved with modern shaping techniques in a particularly cost-advantageous manner.

In a further advantageous embodiment of the invention, optionally an optical transmitter or an optical receiver may be simultaneously designed as a light coupler. Thus, for example, instead of using a light coupler followed by an optical receiver for optical reception, a photo diode can be directly incorporated in the first or second unit. It thus combines the functional features of an optical receiver and a light coupler. In the same way, for example, a laser diode or an LED may be incorporated selectively in the first or second unit. It thus combines the functional features of a light coupler and an optical transmitter.

A further embodiment of the invention provides a light guide consisting of a fiber having a reflectively rendered surface coating. A fiber of this kind, provided on the outside for example with gold or a system of multiple interference layers, is subsequently affixed or adhered into a prefabricated trench or another support. With this, the reflective properties are no longer determined by the trench surface, but by the extremely smooth surface of the fiber. With this, the fabrication costs may be substantially reduced, because the fibers can be produced economically, and at the same time the outlay of machining down the usually large first unit is reduced.

In another embodiment of the invention, the light guide comprises a tube that has been rendered reflective on the outside or inside. A tube of this kind may be used in the same way as the previously described fiber, and offers the same advantages.

A further advantageous embodiment of the invention comprises a light guide having collecting properties in at least one plane. Thereby a widening of the light beam may be reduced, or the light beam may be further bundled.

A further advantageous embodiment of the invention may be used for simultaneous transmission of a plurality of channels by providing different optical wavelengths for transmission. By means of a wavelength-selective emission of signals, and a wavelength-selective receipt of the signals, these may be distinctly separated from each other.

A particularly advantageous embodiment for wavelength-selective transmission of a plurality of channels is obtained when, in particular, a plurality of first light couplers are disposed at different positions of the light guide. In advantageous manner the means for isolation must then be provided to be wavelength-dependent at corresponding positions. In the same way, in advantageous manner the second light couplers are correspondingly disposed at different positions of the second unit. This disposal at different positions simplifies the mechanical attachment of light couplers and reduces the outlay of optical components.

Furthermore, in advantageous manner at least one means for optical isolation is designed to be wavelength-selective.

Preferably a plurality of means for optical isolation are designed to be wavelength-selective and disposed at both locations corresponding to the segment boundaries for the respective wavelength. This design makes possible, for example, wavelength-independent different arrangements of the segment boundaries, as is necessary with a disposal of the light couplers at different positions.

Another advantageous embodiment of the invention provides for polarized light to be transmitted in the light guide. Measurements have shown that many light guides transmit light having a certain polarization with particularly low attenuation. Of particular advantage is, for example, a transmission of light having a polarization perpendicular to a metal surface, as is used, for example, with a mirror-finish-trench as the light guide. Preferably the polarized light is produced by means of a polarized light source. However, it is also possible to provide polarizing filters in the optical path. These may be incorporated in a light coupler, for example.

In a further advantageous embodiment of the invention, at least one polarization-sensitive receiver is provided. Optionally a polarizing filter can be disposed in front of a receiver. If a non-polarized-light source is used for signal emission, then the light is propagated with different attenuations, and frequently also with different transit times, depending upon the polarization.

With a polarization-selective receiver it is now possible to select a definite polarization with a defined transit time or a defined attenuation. By means of this, a substantially position-independent amplitude, and also a lowest signal distortion are obtained.

A further advantageous embodiment of the invention provides a plurality of optical transmitters for emitting polarized light, and simultaneously a plurality of polarization selective optical receivers for receiving polarized light. In this, a plurality of groups of optical transmitters and receivers of matched polarization are formed, so that a transmission of signals occurs within a group, but no signals are transmitted to receivers of other groups. Thereby a multitude of channels may be transmitted simultaneously, using different polarizations.

In another embodiment of the invention, the signal transmission is made by means of a modulation of the polarization. For this, at least one optical transmitter is provided for preferably emitting polarized light. Furthermore, at least one means for modulating the polarization of the transmitter is provided, optionally in the transmitter itself or in the optical path between the transmitter and the receiver. For evaluating the polarization modulation, an optical receiver is provided, having means for converting a change of polarization into an amplitude modulation. This, for example, may be a simple polarization filter.

In accordance with the invention, the above described embodiments of the invention may also be used as independent inventions for improving optical transmission paths of a generic device for transmitting modulated optical signals between a first unit and a second unit.

The further object of the invention is achieved by a fiber-optical sensor comprising at least one light-guiding fiber having at least one light exit face. Furthermore, at least one optical transmitter for coupling optical signals into the light-guiding fiber, and also at least one optical receiver for receiving optical signals from the light-guiding fiber are provided. Thus, the optical signals coupled into the light-guiding fiber by at least one optical transmitter are guided along the light-guiding fiber as far as a light exit face. Now, in order to lead the optical signals out of the light-guiding fiber at the location of the light exit face, at least one means for deflecting the light is assigned to this light exit face. With this, the light is deflected by a given angle away from the longitudinal axis of the light-guiding fiber. A means of this kind for deflection may be, for example, a mirror, a grating, or another optical element that can be integrated with the light-guiding fiber and deflects the direction of the light guided in the fiber towards the outside. The deflection may also be achieved by total reflection, or by diffraction, refraction, or dispersion at a light exit surface.

In a particularly advantageous embodiment of the invention, means are provided for deflecting the light emerging from the light-guiding fiber by reflection, diffraction, refraction or also dispersion.

A further advantageous embodiment of the invention provides for at least one means for deflection being designed as a further face. Here the deflection is preferably achieved by means a total reflection at a face disposed at an appropriate angle. Similarly, the face can be provided with a diffraction grating, or rendered reflective on the outside.

Similarly, a further face could be adapted to reflect a portion of the light guided in the light-guiding fiber back into the fiber in such manner that the light travels through the fiber itself or through a further light exit face provided for this.

As an alternative to this, at least one further face could be disposed at such an angle to the axis of the light-guiding fiber that at least one portion of the light carried in the light-guiding fiber emerges to the outside through the further face. For this, the angle of the face should be chosen so that the angle of emersion corresponds to the given angle of deviation from the longitudinal axis of the light-guiding fiber.

Furthermore, it is of advantage to design at least one light exit face and/or at least one further face to be wavelength selective. For this, optionally the deflection of the light may be made wavelength selective, for example with means for wavelength selective reflection, diffraction, refraction or dispersion. Similarly, the face could also be designed to be a filter.

A further advantageous embodiment provides for at least one optical transmitter and at least one optical receiver to be disposed at different ends of the light-guiding fiber. Thus, in a first section of the light-guiding fiber that is connected to an optical transmitter, light of high intensity is guided. This light is coupled out through at least one light exit face and, following a reflection at one face of a test object, coupled into a suitable light entry face of the second section of the light-guiding fiber. The light coupled in here is guided further in the second section of the light-guiding fiber as far as the optical receiver. Thus, the intensity of the light in the second section of the light-guiding fiber is substantially lower than in the first section. If only one fiber is used for simultaneously carrying the light in both directions, then light of high intensity is guided in the direction of the test object, and light of very low intensity is guided in the opposite direction. In this case, direction-selective coupling elements permitting very little cross-talk must be employed for coupling into or coupling out of the fiber. Problems of this kind do not occur when the fiber is divided into two sections, as set out above.

In another advantageous embodiment of the invention, at least one exit face is provided with an active optical coating. This optical coating comprises a material for a wavelength conversion of the transmitted light. It is preferably based on at least one non-linear optical effect. Preferably this is a fluorescence effect. By means of the wavelength conversion, stray light from the light source can be distinguished easily from a wanted signal now having a converted wavelength. Likewise, in this way and manner different channels, for example with wavelength conversion or without wavelength conversion, can be separated from each other. Furthermore, a known time constant of a non-linear optical effect, for example a fluorescence effect, can be utilized for time measurement, and therewith for distance measurement by an evaluation of transit times.

For a separation of two directions, it is of particular advantage to use two different fluorescent materials excited by a common light source and radiating at different wavelengths.

The above-described optical sensors are of particular advantage when used together with devices for optical transmission in accordance with the present invention.

A very critical issue is the design of the first light couplers 4. In most applications it is necessary to couple light into two opposite directions of the light guide 3. This could be done for example by using fiber-splitters which split light from a single light source 73 into two approximately equal light paths 74 and 75. In some cases, especially when very high data rates or several channels have to be transmitted, the transmission system would be polarization-dependent. Fiber couplers which maintain the polarization of the coupled optical signal are very expensive. Therefore one aspect of the invention is to provide a simple and cost effective coupler which preferably does not change the polarization of the light being coupled.

In a further preferred embodiment of the invention, the first light coupler 4 comprises a first coupling mirror 70 for coupling light into a first light path 74, and a second coupling mirror 71 for coupling light into a second light path 75. A beam splitter 72 is provided for dividing the optical power delivered by a light source 73 into two, preferably equal light beams. The light source 73 could be a LED, a laser diode, an optical fiber, or a lens system, preferably a collimator for forming a parallel beam of light.

Preferably structured mirror coatings are attached to a transparent substrate to form the beam splitter 72. These coatings are preferably molded or sputtered onto the substrate. The structure could be, for example, like a grid, a hexagonal pattern, a random pattern, or any other pattern. Preferably this pattern covers half of the cross-section of the beam coming from the light source 73. This beam is partially reflected by the structured mirror coating into the direction of the first light path 74, or into the first coupling mirror 70. The remainder of the light is coupled into the direction of the second light path 75, or into the second coupling mirror 71. The division ratio of this beam divider can be precisely selected by adjusting the relative coverage of the surface of the transparent substrate by the structured mirror coating. This type of beam splitter is sometimes referred to as a "Polkadot" beam splitter.

Another embodiment of the invention comprises a very thin metal layer on a transparent substrate. A first portion of the light from the light source 73 can pass through the metal layer towards the first coupling mirror 70, while another portion of the light is deflected towards the second coupling mirror 71. The division ratio of this beam divider can be adjusted by means of the thickness of the metal layer.

In a further embodiment of the invention, the beam splitter 72 comprises at least one multi-layer system comprising several layers of metallic and dielectric materials to achieve constant division ratios for all possible states of polarization. Such multi-layer systems are usually dependent upon the optical wavelength, and in most cases only useful for a narrow band. By use of such multi-layer systems, variations of polarization can be minimized. Preferably the layers are arranged on a coplanar slab or the hypotenuse of a half-cube. Light from the light source usually enters the surface of this system at an angle of 45 degrees. The embodiment using a half-cube has the advantage that there is no parallel displacement of the transmitted beam.

Another embodiment of the invention comprises a holographic optical element (HOE) as a beam splitter. The holographic layer is able to deflect the light into different directions, such as into the two light paths 74 and 75. Alternatively, this holographic optical element could be designed to deflect light into the different light paths in dependence upon its wavelength.

In another embodiment of the invention, at least one optical grating is provided in the optical beam splitter 72. At least one optical grating is preferably reversible. In this embodiment, deflection of the light is caused by the grating which is wavelength selective. Preferably the grating is controllable by applying energy. Such a grating could for example consist of liquid crystals, the orientation of these liquid crystals being controllable by an electrical field.

A further embodiment of the invention comprises an optical controllable switch. Such a switch could be configured to switch the optical power from the light source 73 in only one branch of the first light coupler 4. This means that the light could be guided only in that section of the light guide where at least one second light coupler 5 is located. Such an optical switch may consist of liquid crystals. The advantage of an optical switch according to the invention is that the optical power from the light source 73 does not have to be split into several light paths. Instead, the entire optical power is guided into this branch of the first light coupler 4 where at least one second light coupler 5 is located.

DESCRIPTION OF THE DRAWINGS

In the following the invention will be described by way of example, without limitation of the general inventive concept, with the aid of examples of embodiment and reference to the drawings.

DETAILED DESCRIPTION OF THE INVENTION

Figure 1:
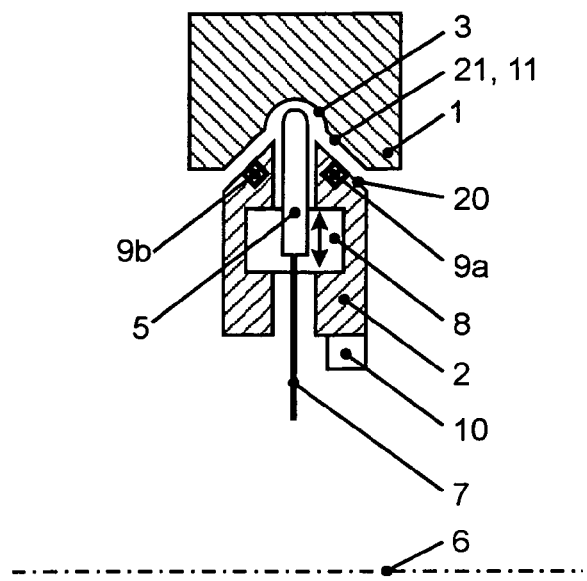
FIG. 1 schematically shows in general form a device for transmitting signals according to the invention.

FIG. 1 shows in schematic form a cross-section of a device for transmitting signals according to the invention. In this, the first unit 1 and also the second unit 2 are shown as discs having a central bore, that are supported for rotation about the rotation axis 6. The light guide 3 is here shown by way of example as a trench having a mirror surface on the inside. It extends around the entire periphery of the first unit. In engagement with this trench is a second light coupler 5, disposed on the second unit 2. This light coupler taps-off light which is guided in the light guide and relays it by means of a light-guiding fiber 7. A hydrodynamic bearing means and also an electrodynamic bearing regulation means are provided for accurate alignment of the light guide and the second light coupler along one axis. The hydrodynamic bearing means is based on a thin air film formed between the first bearing face 21 and the second bearing face 20 by the movement of the two units relative to each other. For backing-up purposes, additional means for guiding the air may be provided, for example. Furthermore, it is of advantage for the device to have emergency running properties for ensuring a measure of guidance even at low speeds in the absence of a sufficient film of air, as may be the case, for example, during an acceleration or braking phase. Furthermore, to enable exact positioning, a sensor 9 is provided for determining the distance between the two units. This sensor senses the distance to a reference track 11 that in the present case is identical with a first bearing face 21. The output signals of the sensor are further processed by means of a control unit 10 and supplied to the actuator 8 for exact regulation of the position of the second light coupler.

Figure 2:
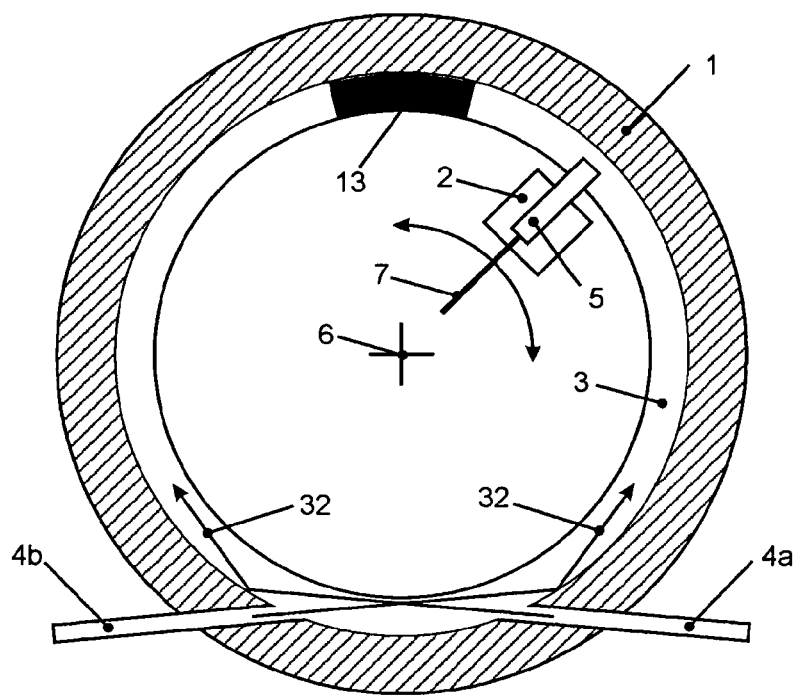
FIG. 2 schematically shows a plan view of a device according to the invention.

FIG. 2 shows in schematic form a plan view of a device according to the invention. A first unit 1 serves for receiving an annular light guide 3. This light guide is, for example, a trench having a mirror surface on the inside. A second unit 2 rotates with respect to the first unit around the rotation axis 6. The second unit contains a second light coupler 5. The manner of operation will now be described separately for the two transmission directions from the first unit to the second unit, or from the second unit to the first unit.

For transmission from the first unit to the second unit, light from a transmitter (not shown) is fed into the light guide 3 by means of the two first light couplers 4a, 4b with the same phase with respect to the modulation signal. The light from the first light coupler 4a passes along the right-hand side of the illustration to the absorber 13. Simultaneously, the light from the first light coupler 4b passes along the left-hand side to the absorber 13. The absorber is disposed symmetrically with respect to the coupling-in position, so that the light paths 32 on both sides are of the same length. Tapping of the light is made by means of a second light coupler 5 that is supported to rotate around the rotation axis 6 along the track of the light guide 3 and supplies the tapped-off light to an optical receiver. For the sake of simplicity the optical receiver also has not been shown.

Figure 3:
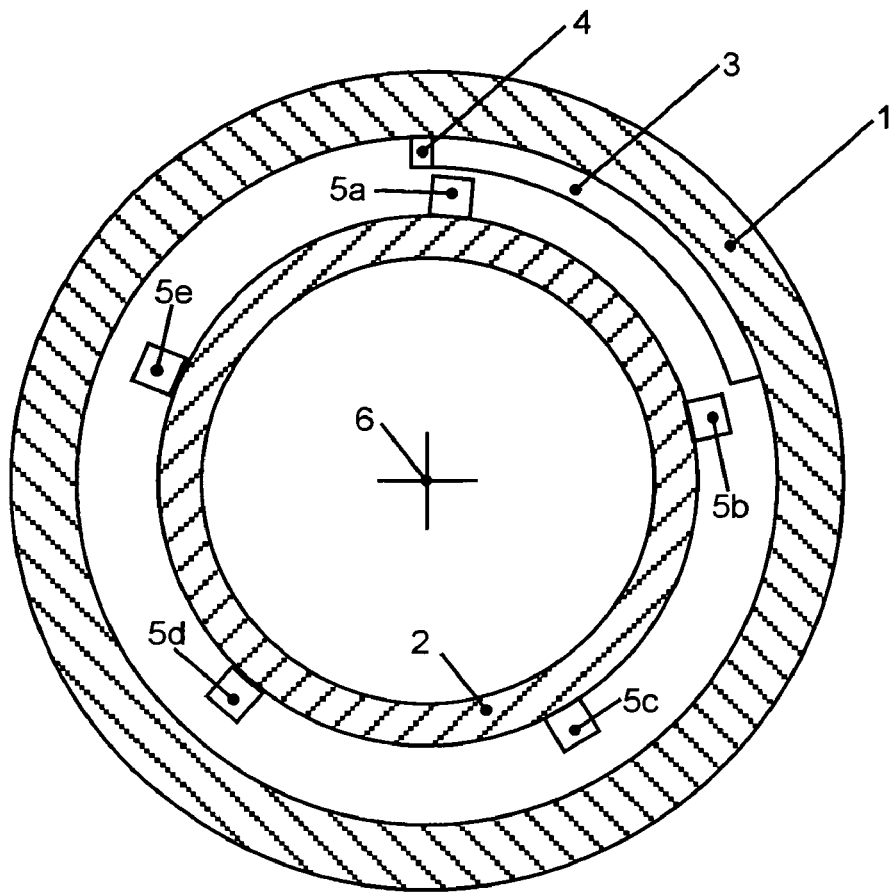
FIG. 3 illustrates the problems of broadband limitation in prior art.

In FIG. 3 the problem of bandwidth limitation is illustrated with reference to the prior art of U.S. Pat. No. 6,104,849. There, light from a second unit 2 that rotates around a rotation axis 6 is transmitted to a first unit 1. Emission of light is effected by means of second light couplers 5a, 5b, 5c, 5d, 5e. The light emitted by these light couplers is transmitted to the first light coupler 4 in the case of an engagement with the light guide 3. The problem-causing boundary case arises when, for example, during a counter-clockwise rotation the second light coupler 5a is just leaving the light guide and the second light coupler 5b enters the light guide. Because all second light couplers are fed from one light source with the same phase, in this boundary case the light from the second light coupler 5a passes to the first light coupler 4 along the shortest path. However, the light from the other second light coupler 5b must travel along a length of path extending through the entire light guide segment 3 and thus enters the first light coupler after a time delay. If, for example, in a computer tomograph having a free inner diameter, the light guide extends along one quarter of the circumference, then this corresponds to a path length of about 0.8 meters. The time delay of an optical wave traveling at the velocity of light is about 2.6 nanoseconds. If now signals having substantially shorter pulse durations are transmitted, then this will lead to the signals being doubly received or, in case of signals being superimposed, to distortion and falsification. Transmission of intelligible data with data signals is only possible, when a bit width is substantially larger than this transit time. In this example, it would still be possible to transmit data having a bit width greater than 10 nanoseconds, i.e. a data rate of 100 Mbit/s. In the other above-mentioned state of the art embodiments, the light guide is usually disposed along the entire circumference, and usually only one second light coupler is provided, so that the transit time difference is determined by the circumference of the device. With very small devices having a diameter of a few centimeters, the band width limitation is frequently of no consequence.

Figure 4:
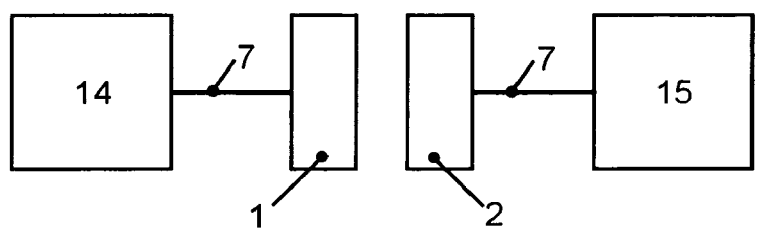
FIG. 4 schematically shows a transmission of optical signals from a first unit to a second unit.

FIG. 4 schematically shows a transmission of optical signals from the first unit to the second unit. An optical transmitter 14 generates modulated optical signals to be transmitted, for example, by means of a light guiding fiber 7 to a first unit 1. From there, coupling is effected to the second unit 2 that transmits the optical signals by means of another light guiding fiber 7 to the optical receiver 15 for evaluation.

Figure 5:
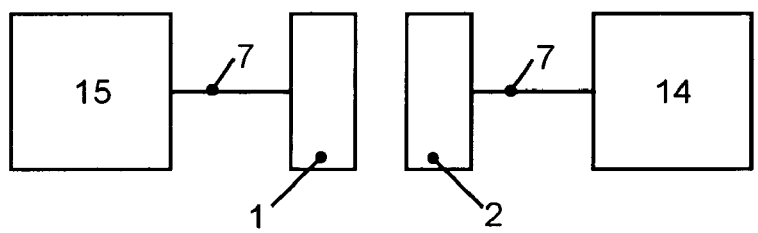
FIG. 5 schematically shows a transmission of optical signals from the second unit to the first unit.

FIG. 5 shows in an analogous manner, but in the opposite direction to that of the previous Figure, the transmission of optical signals from the second unit to the first unit.

Figure 6:
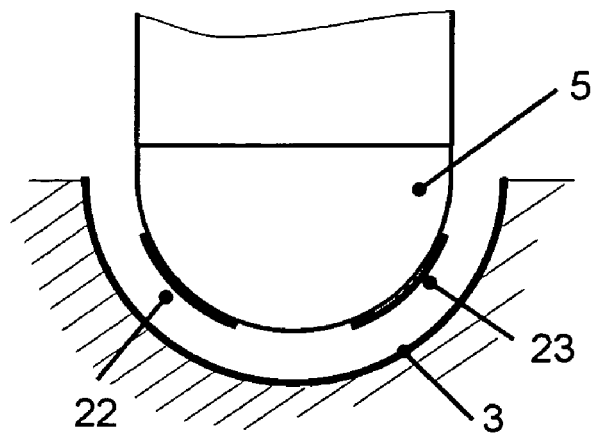
FIGS. 6, 7 and 8 show a capacitive position sensor.

FIG. 6 illustrates by way of example a capacitive sensor for determining the position of the second light coupler 5 relative to the light guide 3. A first capacitive sensor surface 22 and also a second capacitive sensor surface 23 are fixed to the second light coupler or to a member connected thereto. In this embodiment, the light guide, or a surface located below the light guide, such as, for example, a support for the light guide, must be designed to be electrically conductive. For determining the position of the second light coupler relative to the light guide, the capacities between the first capacitive sensor surface and the light guide, and also between the second capacitive sensor surface and the light guide are determined and evaluated. A capacitive sensor of this kind may also be designed to be independent from the light guide and the second light coupler. For a determination of position in one plane, it may have only one capacitive sensor surface. In the same way, it may preferably extend along a U or V shaped trench serving exclusively for determination of position. Preferably, this trench has two surfaces perpendicular to each other.

Figure 7:
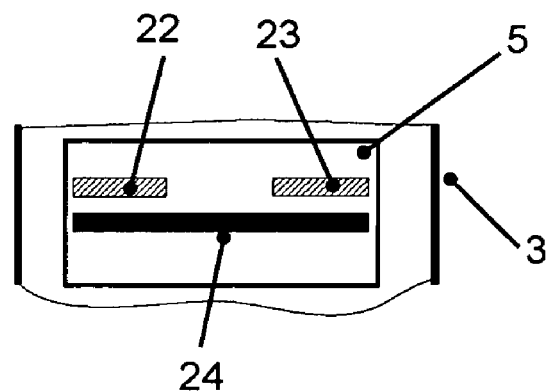

FIG. 7 shows a particularly advantageous embodiment of a capacitive sensor provided with an additional capacitive reference surface 24. Because the light guide that is movable relative to the second light coupler normally cannot be contacted for electrical measurements, the additional capacitive reference surface may now be used for reference purposes.

Figure 8:
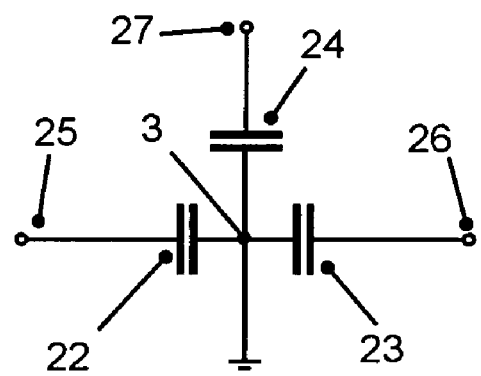

FIG. 8 shows an electrical equivalent circuit with the capacities of the first capacitive sensor surface 22, the second capacitive sensor surface 23, and also the capacitive reference surface 24 with respect to the light guide 3. Because the light guide cannot be contacted directly, a measurement for determining a first position is effected between a first contact point 25 and a reference contact point 27. A measurement for determining a second position is effected between a second contact point 26 and the reference contact point 27. In order to obtain as large as possible a measurement signal, the capacity formed by the capacitive reference surface 24 is chosen to be as large as possible. The center position in the guide may be determined easily by evaluating the capacity differences between the contact points 25, 26 and the reference contact point 27. The absolute value of the capacities is a measure of the absolute height above the middle of the trench.

Figure 9:
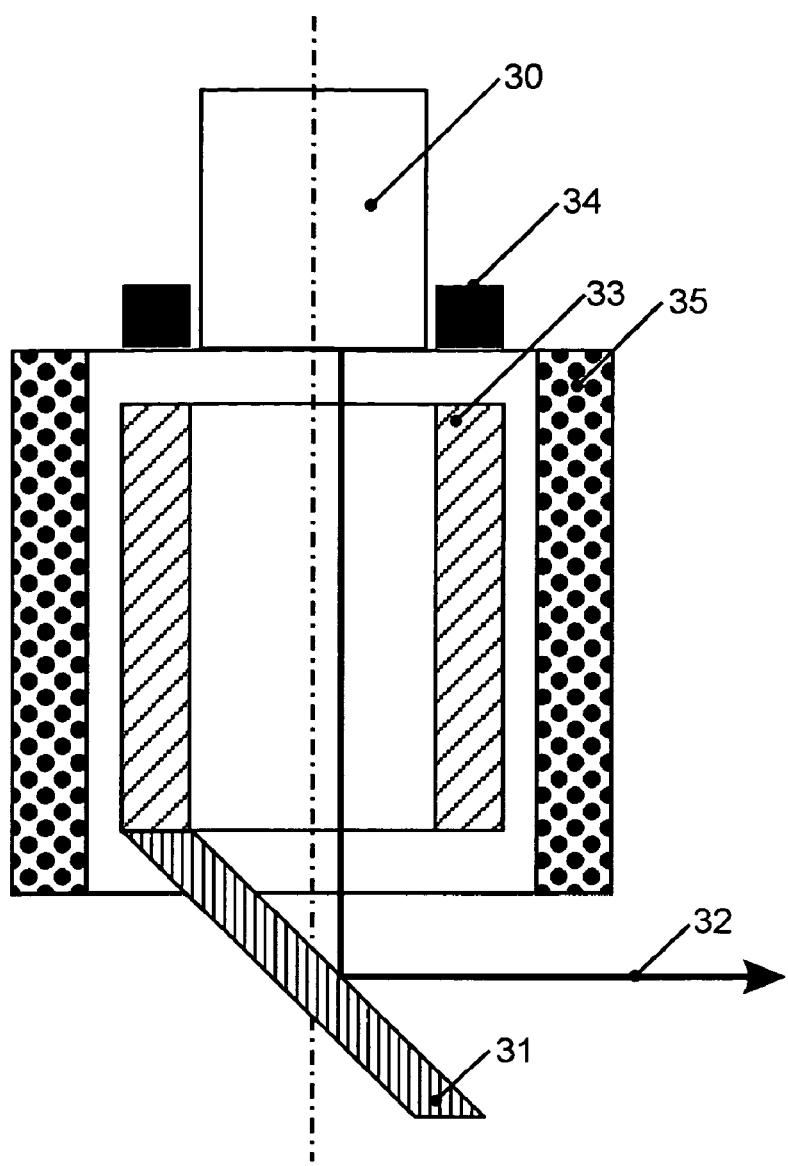
FIGS. 9 and 10 show second light couplers incorporated in a actuator.

FIG. 9 shows a particularly advantageous embodiment of a second light coupler incorporated in an actuator. The path of light 32 extends from an optical system for beam guidance or shaping, for example a collimator, via a mirror 31 in the direction of a light guide which is not shown here. Of course, the path of light may also extend in the opposite direction. The mirror 31 is attached to an anchor 33. Guidance or bearing-support is performed by the magnetic field of a permanent magnet 34, and also a coil 35. The embodiment shown here offers the advantage of a mechanical decoupling of a light guide, or a light source, or a receiver on a side of the collimator facing away from the light guide.

In order to obtain a substantially lower coupling attenuation, however, a waveguide may be employed instead of the collimator and the mirror. This embodiment also is less prone to being easily contaminated by dirt.

Figure 10:
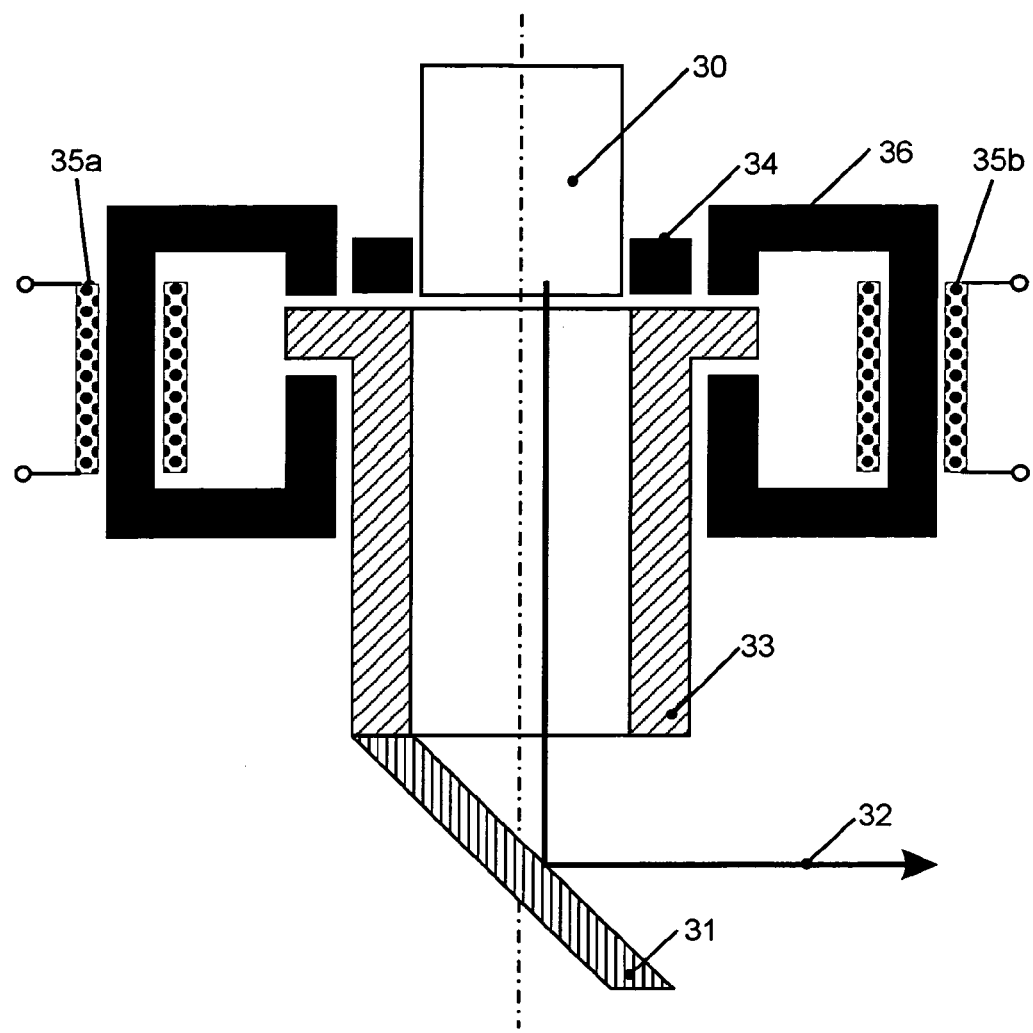

In FIG. 10 a further embodiment of a light coupler incorporated in an actuator is shown. The embodiment is similar to that of FIG. 9. However, at least one yoke 36 is provided for guiding a magnetic field generated by at least one coil 35a, 35b.

Figure 11:
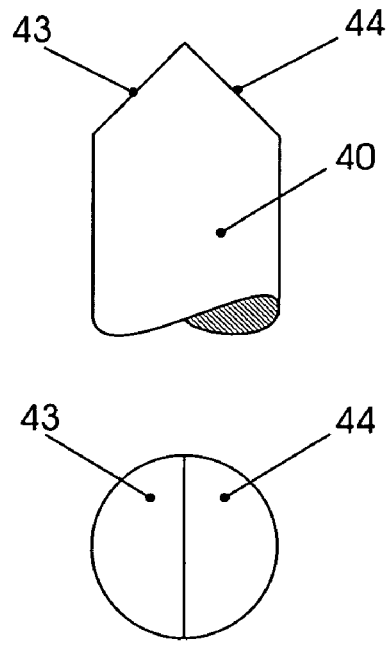
FIG. 11 shows an optical position sensor.

In FIG. 11 an optical position sensor is shown. Advantageously, a position sensor of this kind extends, as does a second light guide 5, in close contact with the light guide 3. It comprises an optical waveguide 40 that is fed with light of at least one wavelength from a not shown light source. Depending upon the closeness of approach of a first sensor face 43 or a second sensor face 44 to the respective boundaries of the light guide, the light is reflected more or less strongly. An evaluation of the intensity of the reflected light is effected in a not shown sensor unit which, in the case of a plurality of wavelengths, also performs a wavelength-selective evaluation. Thus, for example, the first sensor surface 43 may be operated at a first wavelength, whilst the second sensor surface 44 may be operated at a second wavelength. For this, wavelength-selective filters are preferably disposed on the exit surfaces. Apart from being adapted to evaluate the intensity, the arrangement also may be designed so that the polarization of the reflected light changes according to the distance. The sensor is shown in FIG. 11 in a side view, and below this in a plan view. This sensor may also be rotated through 90 degrees and used as a light coupler. In this case the first sensor face 43 would correspond to a first coupling face 41, and the second coupling face 44 to a second sensor face 42.

Figure 12:
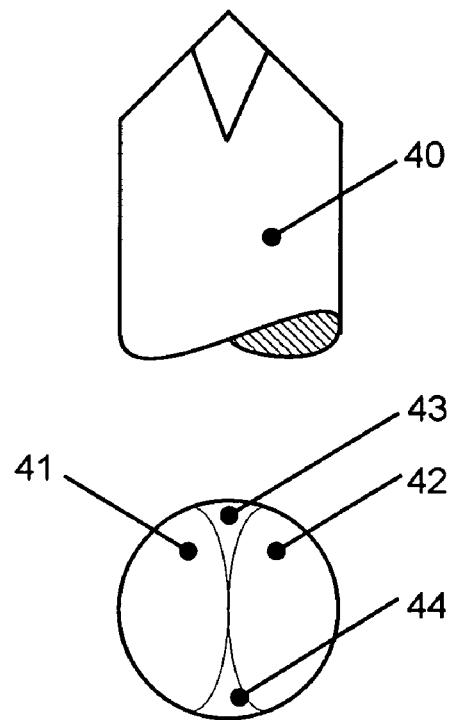
FIG. 12 shows a second light coupler with an incorporated optical position sensor.

FIG. 12 shows a second light coupler combined with a position sensor in one unit. Here, in addition to the previously shown drawing, a first coupling face 41 and also a second coupling face 42 are provided for coupling light into or out of the light guide for transmission of information. Advantageously, the first coupling face and the second coupling face are disposed to be diametrically opposite to each other in order to couple light into or out of the light guide in both directions.

Figure 13:
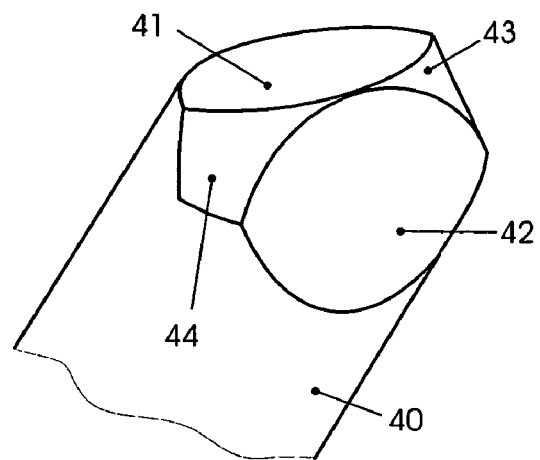
FIG. 13 shows a perspective view of the second light coupler of FIG. 12 for the purpose of illustration.

For the sake of distinct illustration, FIG. 13 shows a perspective view of the second light coupler of FIG. 12.

Figure 14:
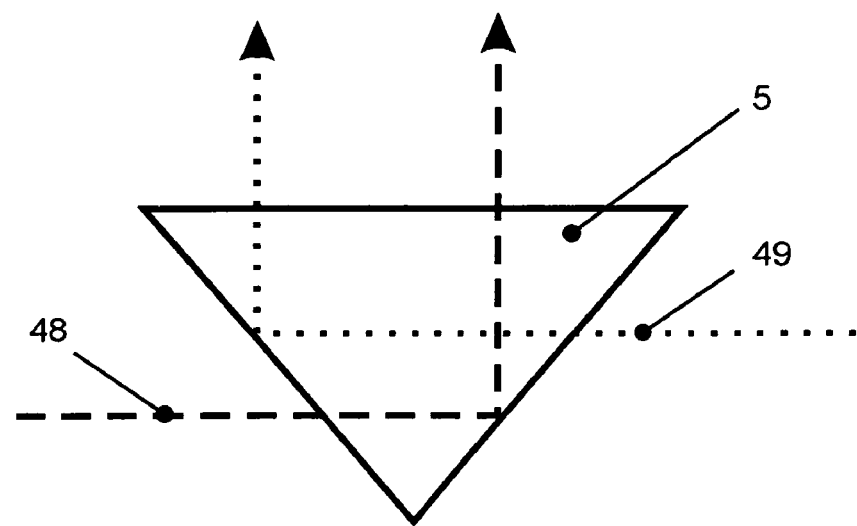
FIG. 14 schematically shows a coupling of light into or out of a light guide by means of a second light coupler.

FIG. 14 illustrates the principle of light coupling and light deflection. Thus, for optical coupling, light which is guided in various directions of the light guide 3 is selectively deflected in a second light coupler 5. The deflection is effected preferably by refraction. In this manner, light may be coupled into and also out of the light guide. The rays as drawn do not correspond exactly to the physical beam path, but schematically represent the conveying of signals correctly.

Figure 15:
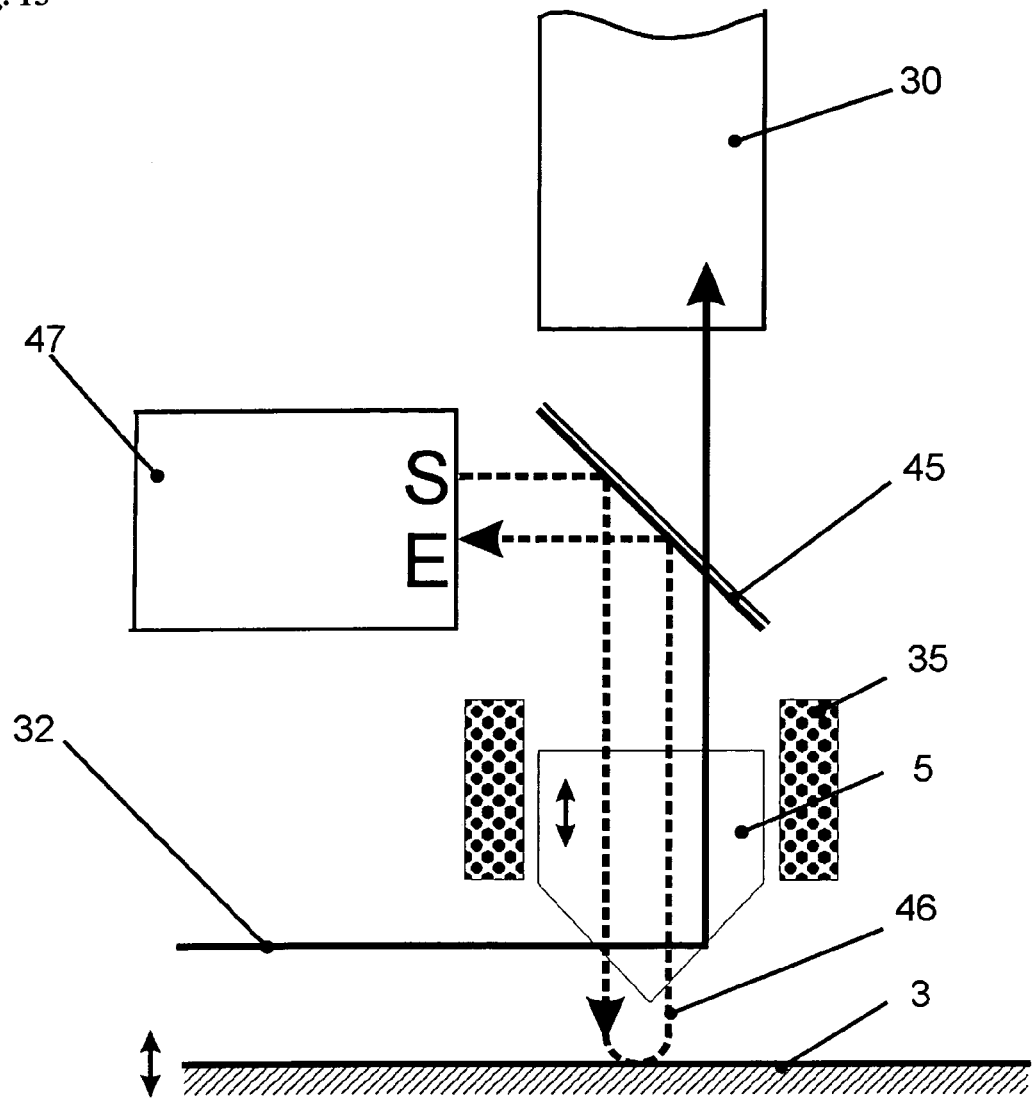
FIG. 15 shows a schematic construction of control means and incorporation of a second light coupler having an optical position sensor incorporated therein.

FIG. 15 shows schematically the construction and incorporation of a second light coupler having an incorporated optical position sensor. A second light coupler 5 is disposed to be movable and of adjustable height by being suitably controlled by a coil 35. Guiding of the light beam 32 from the light guide 3 is effected by means of a second light coupler 5 in an optical system 30 for beam guiding or shaping. This system can convey the light, for example into a light-guiding fiber. However, in the same way it is possible to dispose a light-guiding fiber directly at this position, without the addition of any beam-shaping system. Of course, light may also be transmitted in the opposite direction. For determining the exact position, light is deflected by a position-sensor transmitter/receiver 47 by means of a wavelength-selective mirror 45 located in the beam path in the direction of the second light coupler 5, by which means it is coupled into the light guide for position determination, as has already been described. Light 46, reflected in dependence on the position, is transmitted back via the second light coupler and also the wavelength-selective mirror to the position-sensor transmitter/receiver 47 for evaluation. This can now determine the position of the second light coupler from the light intensity, and emit a corresponding measurement signal to the control unit for controlling the coil 35 of the actuator. Instead of a wavelength-selective mirror, a commercially available ground and polished coupler may be used, although with larger attenuation. In his case, optionally a waveguide may be used for supplying a signal and for signal coupling.

Figure 16:
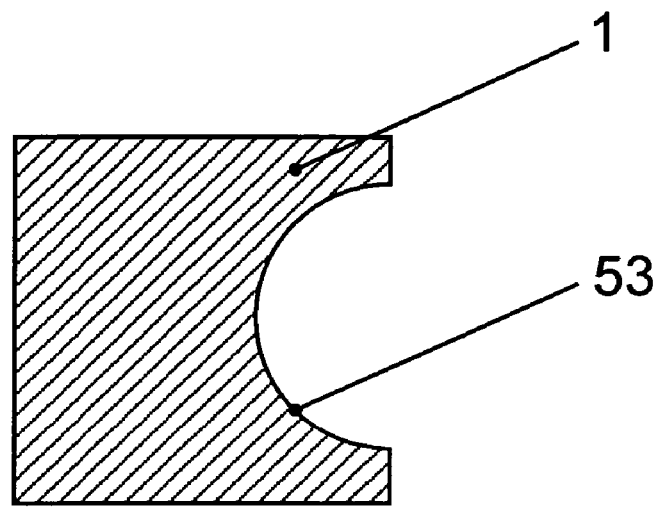
FIG. 16 shows a light guide comprising a reflective coating.

FIG. 16 represents a light guide 3 having a reflective coating. In this case, the light guide consists of a groove formed in the first unit 1. The surface of this groove is provided with a reflecting coating 53.

Figure 17:
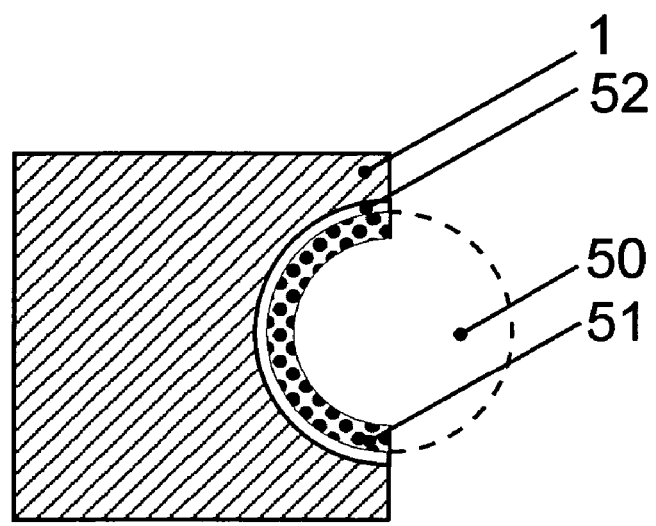
FIG. 17 shows a light guide comprising a coated fiber.

FIG. 17 represents a light guide fabricated from a coated tube. A reflectively coated tube 50 is fixed in a suitable groove in a first unit 1 by means of an adhesive 52. Now, in order to obtain a trench-shaped open light guide, the tube is machined and finished to provide the final contour 51. As an alternative to this, the machining may also be performed before the fixing with adhesive is made. A coated fiber may also be used instead of this tube.

Figure 18:
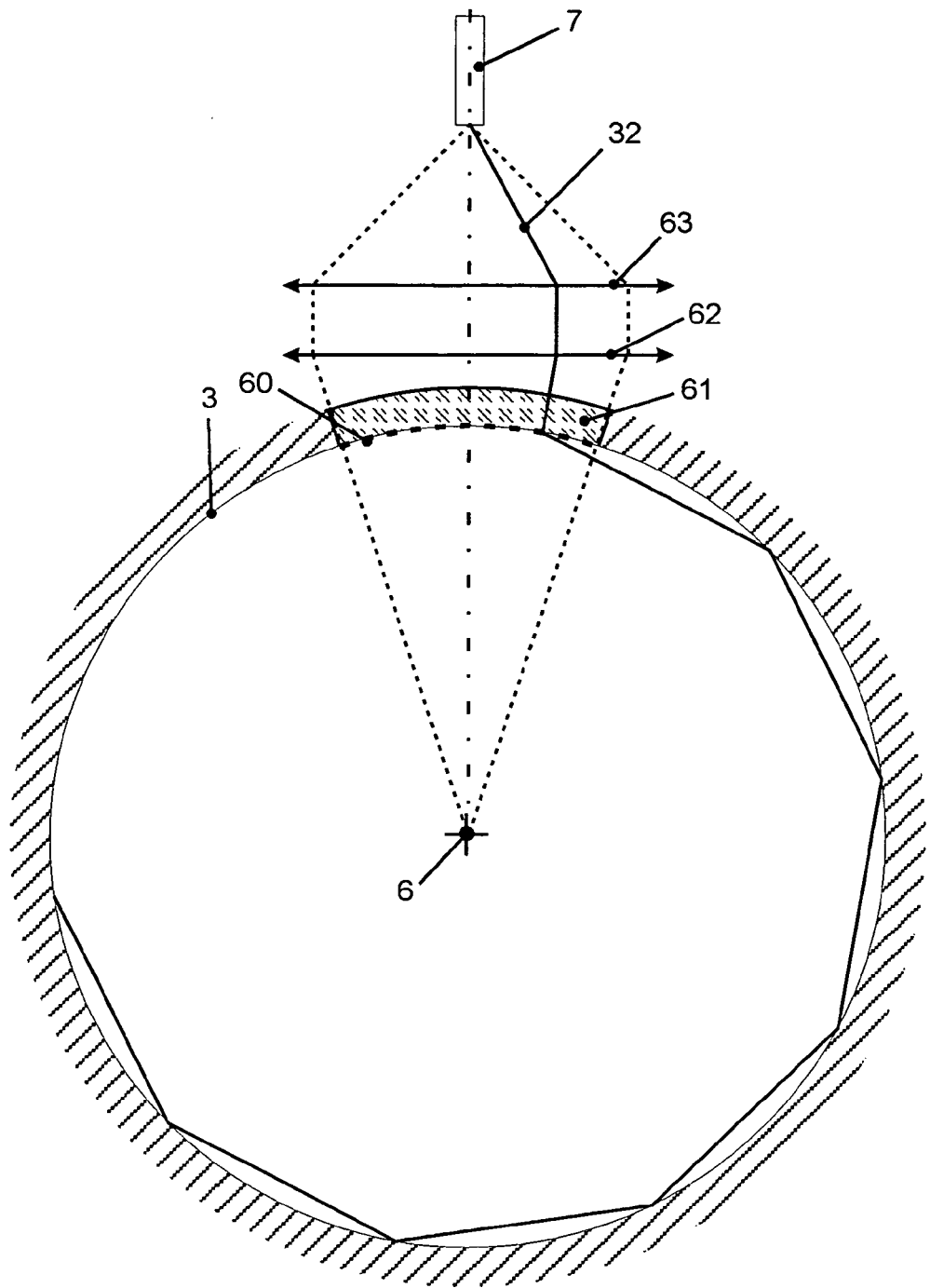
FIG. 18 shows the principle of a construction of a grating coupler.

FIG. 18 shows the principle of the construction of a grating coupler. In this embodiment, the light guide 3 has a recess in the shape of an arcuate segment along its circular perimeter around the rotation axis 6. This recess contains an optically transparent material 61 supporting an optical grating 60. Light rays 32 which would strike the grating within this arcuate segment are deflected outwards by the grating and focused upon the entry opening of a light guiding fiber 7 by means of a first lens 62, and also a second lens 63. Of course, other lens arrangements may also be implemented. Because the individual light rays all strike the grating at the same angle, although at different positions, an unchanging lattice constant may be used over the entire arcuate segment. Thus, an order of diffraction may be produced to correspond to a divergent wave having its origin on the rotation axis 6. This point represents the focal point for all coupled out signals. It is imaged onto the end of the light-guiding fiber 7 by means of the two lenses. The device is particularly non-sensitive to dust and other contamination, because the substantial components of the optical system, the two lenses, and also the light-guiding fiber can be disposed in protected surroundings. Furthermore, even the inserted optical grating does not cause the light guide to have any holes or undercut portions at which deposits of contaminating matter may be formed.

Figure 19:
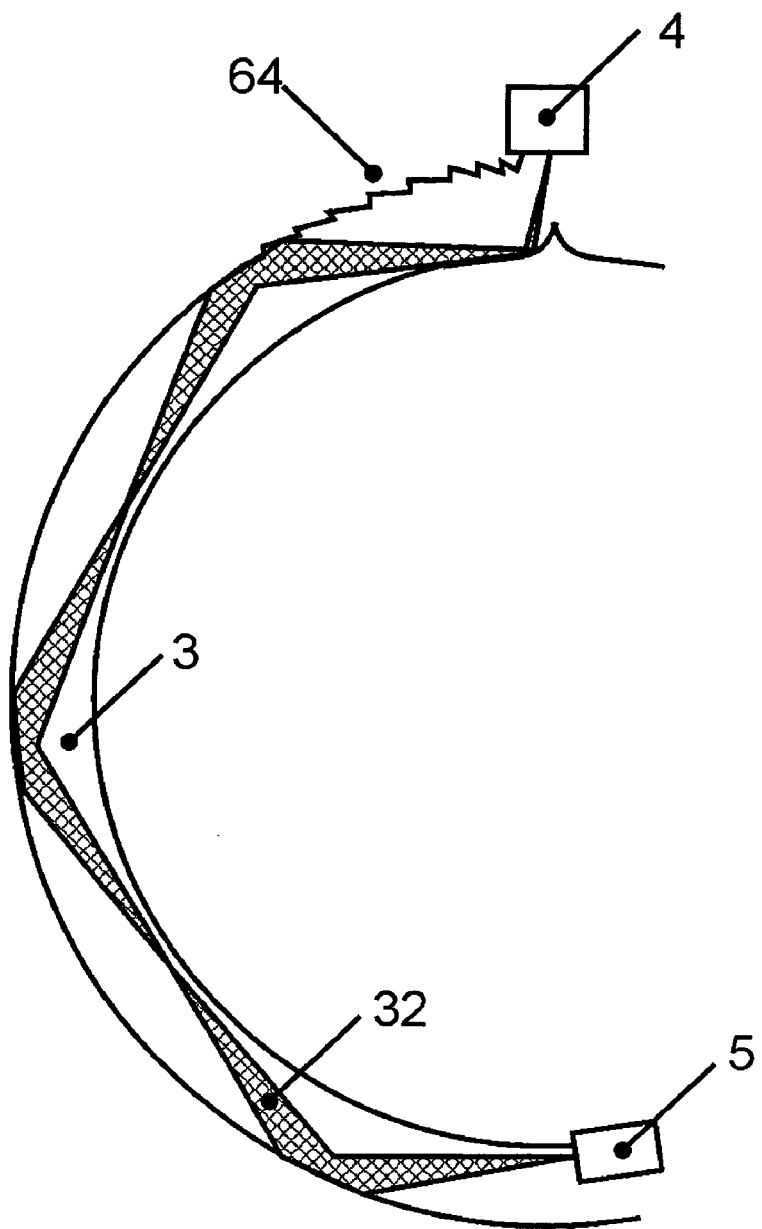
FIG. 19 shows a coupling of a signal by means of a Fresnel structure.

FIG. 19 represents a coupling of a signal by means of a Fresnel structure 64. A light guide 3 assigned to a first unit 1 has a step-like structure in the vicinity of a first light coupler 4 for deflecting a beam emitted by a second light coupler in the direction of the first light coupler.

Figure 20:
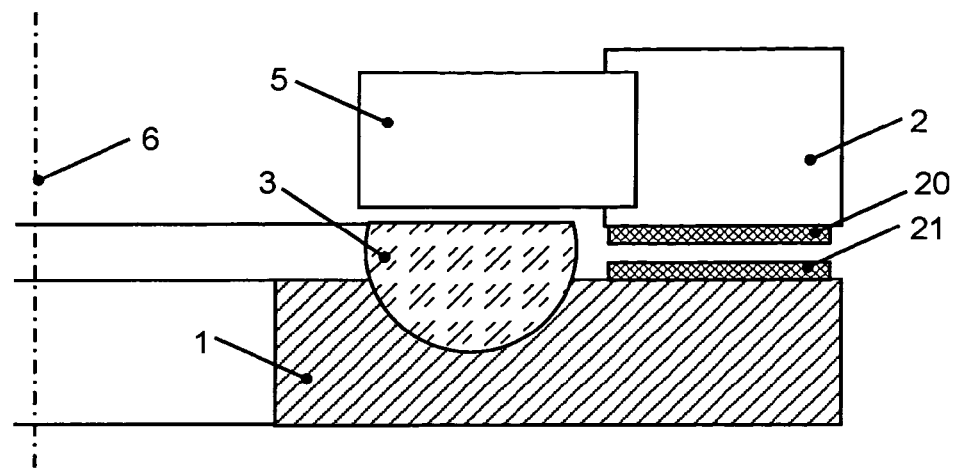
FIG. 20 shows a device for coupling-in a surface wave.

FIG. 20 shows an embodiment of the invention for coupling-in a film wave or surface wave. The light guide 3 is here shown by way of example as a fiber having a core with a ground-flat portion. For coupling, a prism 5 is guided along and at a short distance from the ground-flat surface of the light guide. In the present example (not shown), light is coupled into this prism from above. For exactness of alignment, a hydrodynamic bearing means comprising a first bearing face 21 and a second bearing face 20 is provided. Corresponding bearing elements may also be provided perpendicularly thereto for achievement of stabilization along the direction of a second axis. The light guide itself may also be used as a bearing face.

Figure 21:
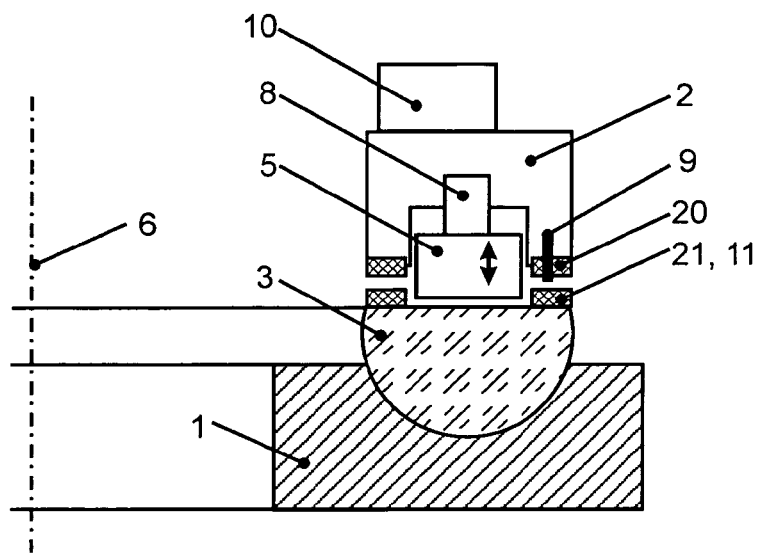
FIG. 21 shows a device comprising an incorporated means for active and passive position regulation.

FIG. 21 shows a further embodiment of the invention in which a hydrodynamic bearing means supplemented by an active position regulation means is provided. One of the first bearing faces 21 simultaneously serves as a reference track 11 for the sensor 9.

Figure 22:
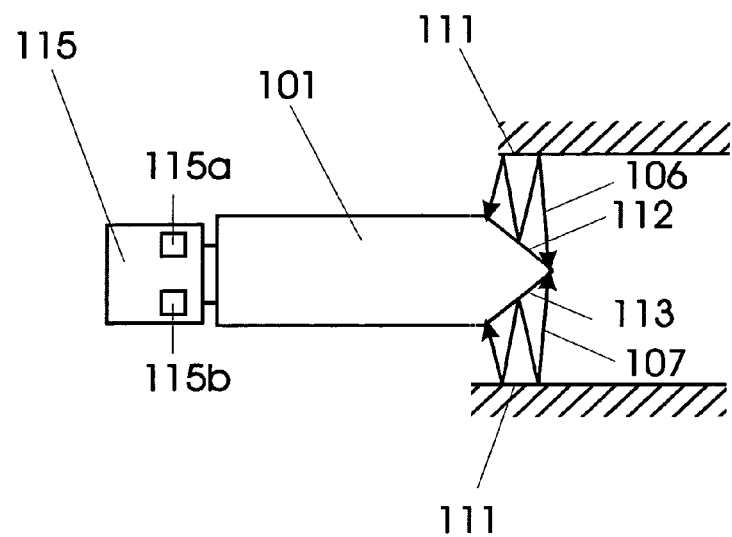
FIG. 22 shows in schematic form a fiber-optical sensor in accordance with the invention.

FIG. 22 schematically shows in general form a fiber-optical sensor according to the invention. The center piece of this fiber-optical sensor is the light-guiding fiber 101. An optical transmitter 115a couples light into the light-guiding fiber. This light is guided along the light-guiding fiber and emerges laterally from the fiber at the two faces 112 and 113. It is then reflected by the surface of a test object 111, and at least partially re-enters the light-guiding fiber 101 through the faces 112 and 113. This light is now guided in the opposite direction in the light-guiding fiber to the optical receiver 115b that is able to evaluate the information of the light. In this, for example, the attenuation, the transit time, a phase shift, or even an interference pattern can be evaluated. For this, at least in the latter case, the light source should emit coherent light. In a particularly compact embodiment, the optical transmitter 115a and the optical receiver 115b are jointly accommodated in a common housing, as shown here. The arrangement shown here as an example is provided with two faces 112 and 113. Of course, an arrangement in accordance with the invention can be also constructed to have only one face, or a large number of faces, for example 4 faces. In the case illustrated here, having two faces, there results a first light path 106 in both directions between the first exit face 112 and a first part of the surface of the test object 111. A second light path 107 also exists in both directions between the second exit face 113 and a second part of the surface of the test object 111.

Figure 23:
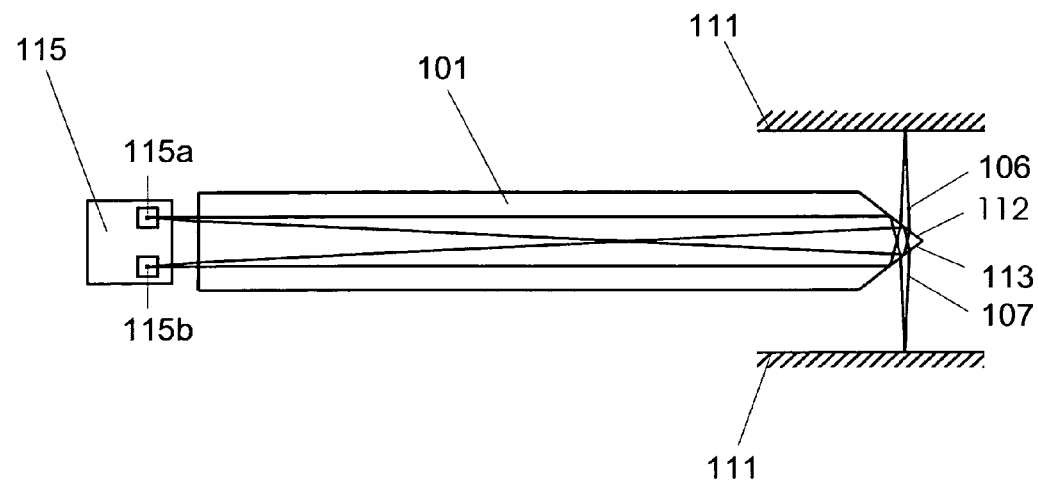
FIG. 23 shows ray paths in a sensor according to the invention.

FIG. 23 shows the path of rays in a device according to the invention. The light paths starting from the optical transmitter 115a and leading to the light exit faces 112 and 113 inside the light-guiding fiber 101 are shown in the drawing. The paths of the returning light, reflected by the surfaces of the test object, to the optical receiver 115b are also shown.

Figure 24:
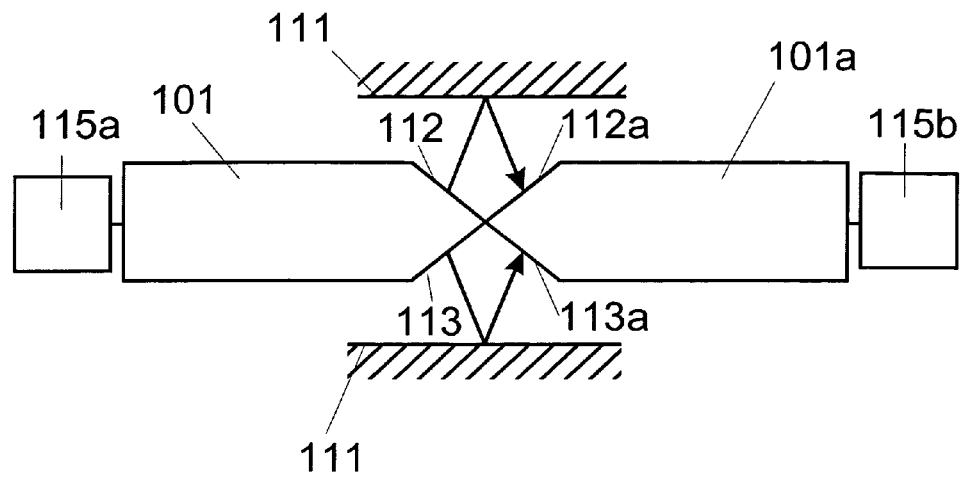
FIG. 24 shows another embodiment of the invention with a sensor divided into two.

FIG. 24 shows a further embodiment of the invention having a sensor divided into two. In this, the light-guiding fiber 101 is divided into a first segment for light emission 101a, connected to the optical transmitter 115a, and a second segment for light reception 101b, connected to the optical receiver 115b. As a result of this division, a particularly good and simple decoupling between the transmitted signal and the received signal is obtained. Emergence of the light occurs through the two light exit faces 112 and 113 of the first fiber segment 101a. Light entry occurs through the two faces 112a and 113a of the second fiber segment 101b.

Figure 25:
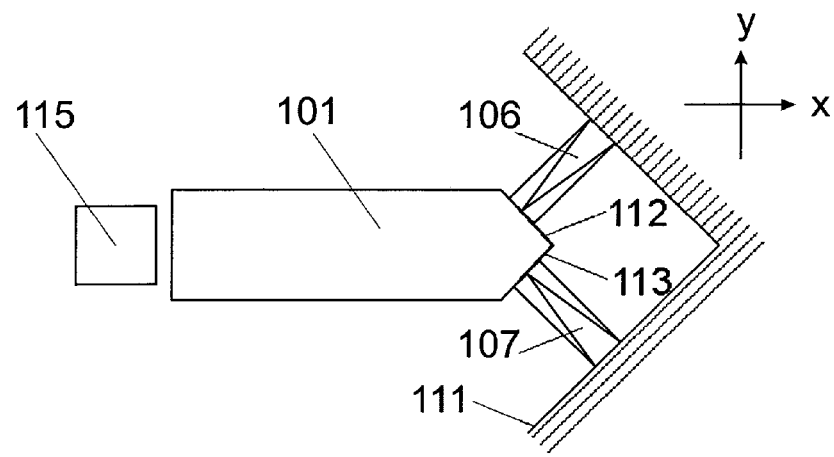
FIG. 25 shows in schematic form an alternative embodiment of the invention.

FIG. 25 also shows schematically in a general form a fiber-optical sensor according to the invention, which is constructed similarly as shown in FIG. 22. As distinct from FIG. 22, here the portions of the surface of the test object do not extend parallel to the axis of the fiber-optical sensor, but are inclined at an angle thereto. The exit faces 112 and 113 also are suitably formed so that the light enters into and emerges from the fiber at an angle which is preferably perpendicular to the surface of the test object.

Figure 26:
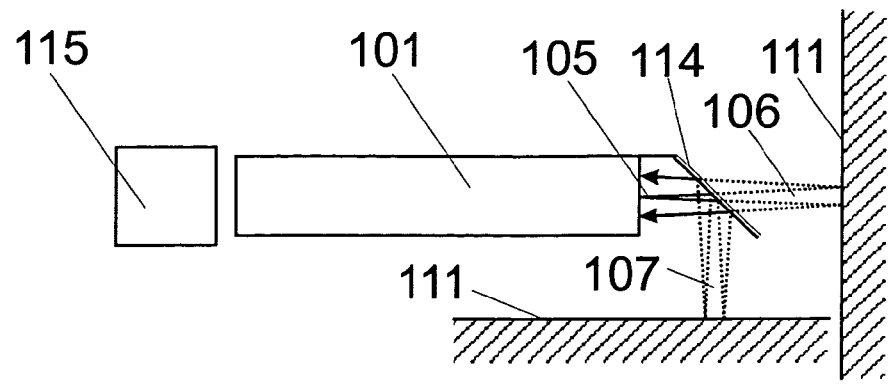
FIG. 26 shows a further embodiment of the invention having a discrete wavelength selective mirror.

FIG. 26 shows a further embodiment of the invention, in which the light travels along a first light path 106 parallel to the axis of the light-guiding fiber 101, and is deflected along a second light path 107 perpendicular to the axis of the light-guiding fiber by means of a wavelength selective mirror 114.

Figure 27:
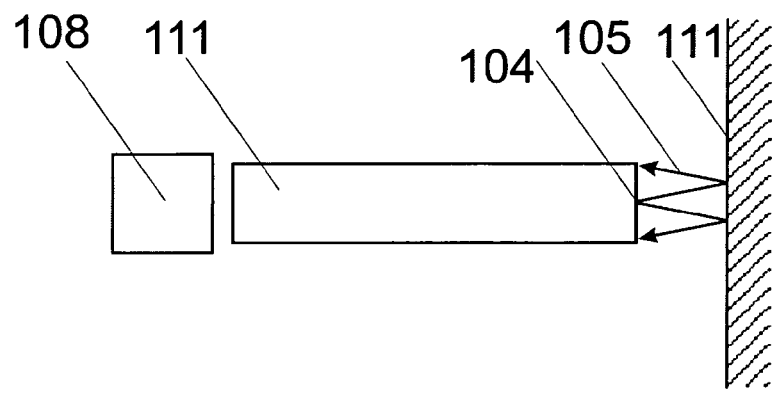
FIG. 27 shows a fiber-optical sensor according to prior art.

FIG. 27 shows a fiber sensor according to prior art. This fiber sensor is based on a light-guiding fiber 101 into which light is coupled from an integrated transmitter and receiver unit 108 disposed at a first end. This light is coupled out through the fiber end face 104 at the other end of the light-guiding fiber and reflected from the surface of the test object 111 along the light path 105. That portion of the reflected light which is reflected back directly onto the fiber end face is guided in the light-guiding fiber to the integrated transmitter and receiver unit 108 and evaluated. The point of measurement of this fiber sensor is exactly at the point of intersection of the axis of the light-guiding fiber 101 and the surface of the test object 111.

Figure 28:
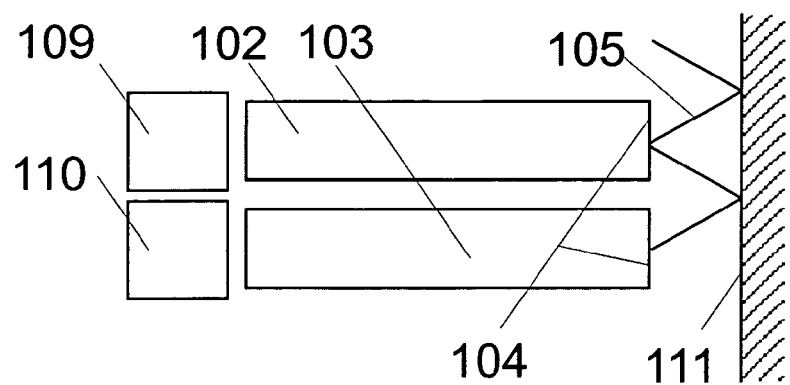
FIG. 28 shows a fiber-optical sensor according to prior art, having two light-guiding fibers.

The design of the fiber sensor in FIG. 28 according to other prior art corresponds substantially to that of FIG. 27, a transmitting fiber 102 for guiding the light coupled in from the transmitter unit 109 and a receiving fiber 103 for guiding back the reflected signal to the receiver unit 110 being provided instead of a single light-guiding fiber. In this embodiment, the point of measurement is exactly at the point of intersection of the axis of the fiber sensor, defined as being the center axis of the two fibers 102 and 103, and the surface of the test object 111.

Figure 29:
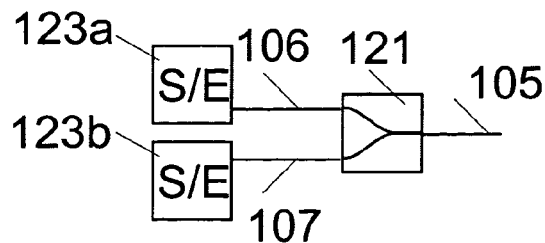
FIG. 29 shows an integrated transmitting/receiving unit for multi-channel fiber sensors.

FIG. 29 shows an integrated transmitter/receiver unit for multi-channel fiber sensors. In this, the first light path 106 of a first integrated transmitting/receiving element 123a is combined with the second light path 107 of a second integrated transmitting/receiving element 123b by means of a WDM-coupler 121 to form a common light path 105.

Figure 30:
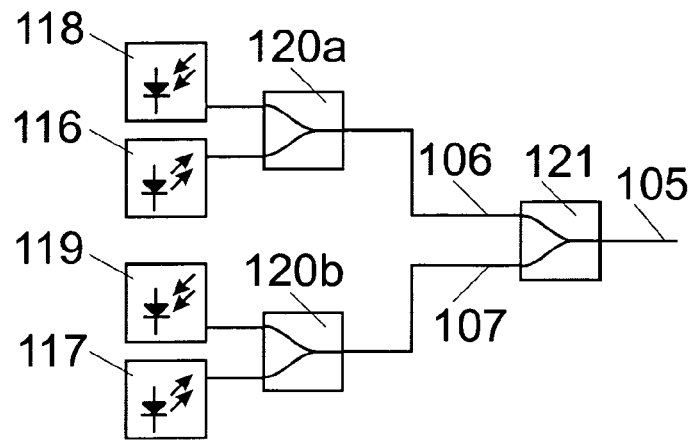
FIG. 30 shows a modification of FIG. 27 with 1×n couplers.

FIG. 30 shows an arrangement corresponding to that of FIG. 29, wherein the integrated transmitting/receiving elements 123a and 123b are respectively replaced, in the first case by a first receiving element 118 having a first wavelength $\lambda 1$ and a first transmitting element 116 having the same wavelength $\lambda 1$, combined with each other by means of a 1×n coupler, and in the second case, similarly in the second optical path, by a second receiving element 119 combined with a second transmitting element 117, both having the wavelength $\lambda 2$. For the operation, of course, it is not absolutely essential that in each case the two elements have exactly the same wavelength $\lambda 1$ or $\lambda 2$, respectively. Rather than this, it is sufficient for each pair of elements 116 and 118, and 117 and 119, respectively, to have overlapping working ranges, and for the ranges of $\lambda 1$ and $\lambda 2$ to be separate from each other to an extent that only negligible cross-talk occurs.

Figure 31:
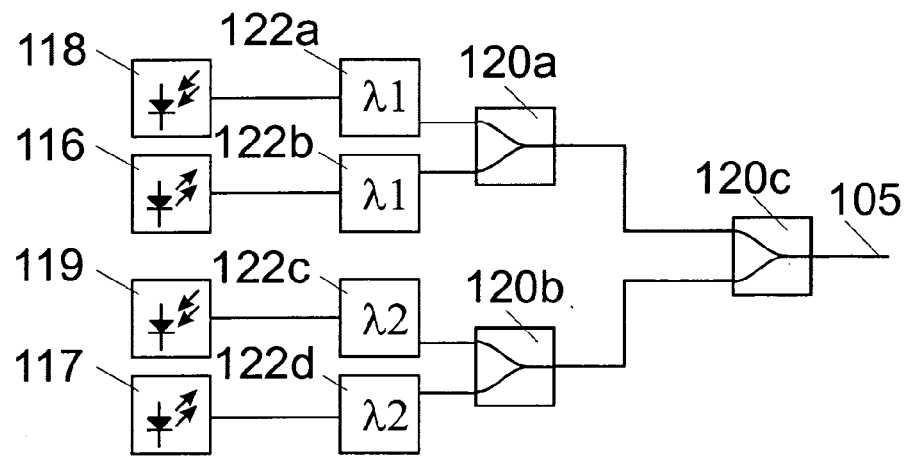
FIG. 31 shows an embodiment with wavelength selective filters.

Finally, FIG. 31 shows yet another embodiment having wavelength-selective filters 122a, 122b, 122c, and 122d.

Figure 32:
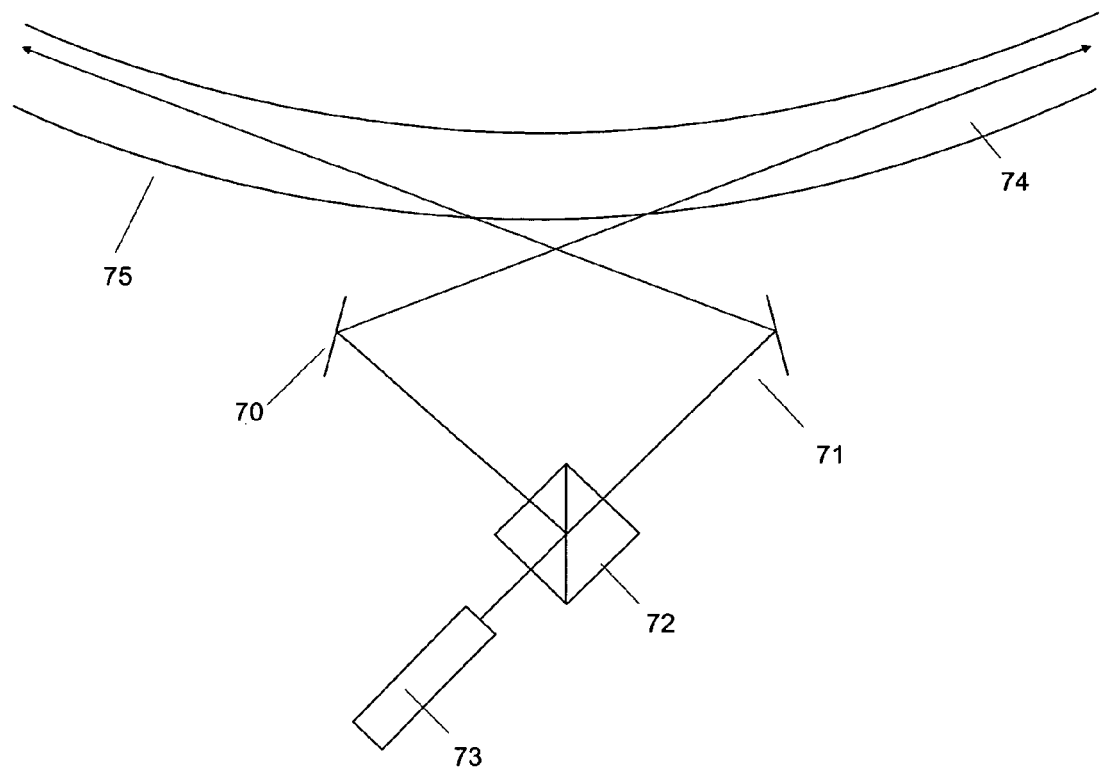
FIG. 32 shows an embodiment of light coupler 4.

FIG. 32 shows another embodiment of the invention. Light being emitted by the light source 73 is divided into two preferably equal beams by means of the beam splitter 72. One of these beams is deflected by the first coupling mirror 70 into the first light path 74. The other beam is deflected by the second coupling mirror 71 into the second light path 75. Instead of splitting the light from the light source 73 into two beams, it could also be splitted into a higher number of beams. Preferably all these beams have the same optical power level.

Figure 33:
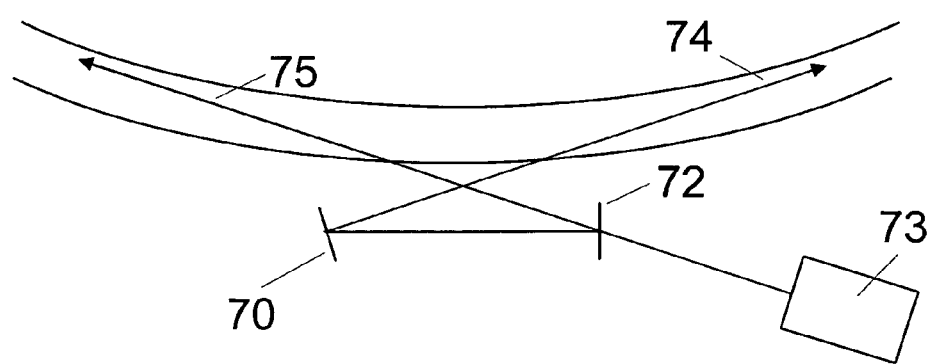
FIG. 33 shows another embodiment of light coupler 4.

FIG. 33 shows a further embodiment of the invention. Light being emitted by the light source 73 is divided into two preferably equal beams of the beam splitter 72. One of these beams is deflected by the first coupling mirror 70 into the first light path 74. The other beam is directly fed into the second light path 75.

Figure 34:
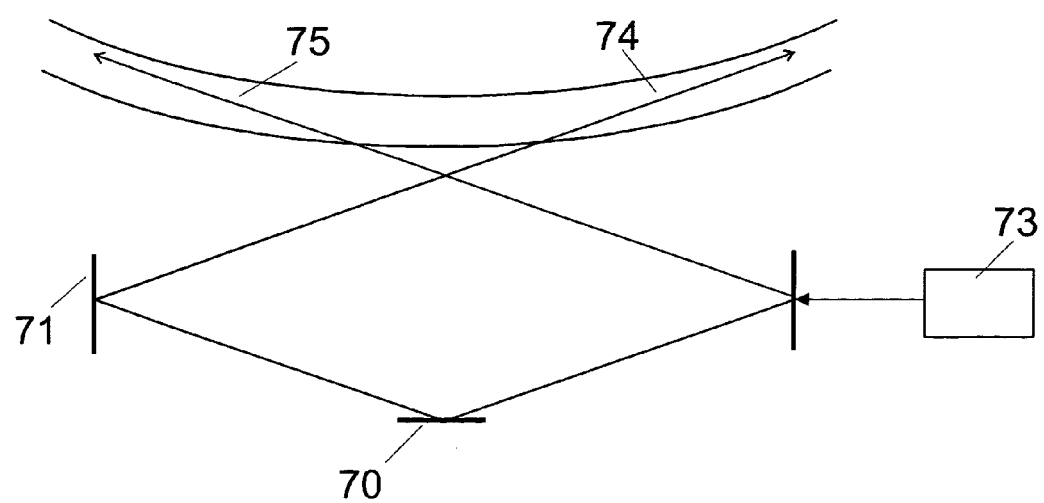
FIG. 34 shows a further embodiment of light coupler 4.

FIG. 34 shows another embodiment of invention, where the first beam from the beam splitter 72 is deflected into the first light path 74 by means of a first coupling mirror 70 and a second coupling mirror 71.

LIST OF REFERENCE NUMERALS

1 First unit
2 Second unit
3 Light guide
4 First light coupler
5 Second light coupler
6 Rotation axis of the rotation between first and second unit
7 Light guiding fiber
8 Actuator
9 Sensor
10 Control unit
11 Reference track
12 Means for hydrostatic or hydrodynamic bearing
13 Absorber
14 Optical transmitter
15 Optical receiver
20 Second bearing face
21 First bearing face
22 First capacitive sensor surface
23 Second capacitive sensor surface
24 Capacitive reference surface
25 First contact point
26 Second contact point
27 Reference contact point
30 Optical system for beam guidance or shaping
31 Mirror
32 Light beam
33 Anchor
34 Permanent magnet
35 Coil
36 Yoke
40 Optical waveguide
41 First coupling face
42 Second coupling face
43 First sensor face
44 Second sensor face
45 Wavelength-selective mirror
46 Light ray of the position sensor
47 Position-sensor transmitter/receiver
48 First light path
49 Second light path
50 Coated tube
51 Finished tube
52 Adhesive
53 Reflective coating
60 Grating
61 Optically transparent material
62 First lens
63 Second lens
64 Fresnel structure
70 first coupling mirror
71 second coupling mirror
72 light source
73 first light path
74 second light path
101 Light-guiding fiber
102 Transmitting fiber
103 Receiving fiber
104 Fiber end face
105 Light path
106 First light path
107 Second light path
108 Integrated transmitter/receiver unit
109 Transmitter unit
110 Receiver unit
111 Surface of test object
112 First light exit face
113 Second light exit face
114 Wavelength selective beam splitter element
115 Combined optical transmitter and receiver
115a Optical transmitter
115b Optical receiver
116 Transmitting element $\lambda 1$
117 Transmitting element $\lambda 2$
118 Receiving element $\lambda 1$
119 Receiving element $\lambda 2$
120 1×n coupler
121 WDM coupler
122 Wavelength selective filter
123 Integrated transmitting/receiving element

What is claimed is:

1. Device for transmitting modulated optical signals between a first unit and a second unit, the first unit being supported for rotary movement relative to the second unit, comprising:
   a light guide along a circular track on the first unit;
   at least one first light coupler connected to the light guide for coupling light into or out of the light guide;
   at least one second light coupler disposed on the second unit and movable relative to the light guide, for coupling light into or out of the light guide; and
   wherein hydrostatic or hydrodynamic bearing means are provided to maintain at least one second light coupler in a defined position relative to the light guide along at least one axis, preferably along two axes perpendicular to a tangent of a rotary movement of the two units by means of a liquid or gaseous medium, or a bearing means based on a liquid or gaseous medium, preferably air.

2. Device for transmitting modulated optical signals between a first unit and a second unit, the first unit being supported for rotary movement relative to the second unit, comprising:
   a light guide along a circular track on the first unit;
   at least one first light coupler connected to the light guide for coupling light into or out of the light guide;
   at least one second light coupler disposed on the second unit and movable relative to the light guide, for coupling light into or out of the light guide; and
   wherein at least one second light coupler has an actuator and associated therewith at least one sensor and a control unit for adjusting a position of the light coupler, at least one sensor being provided for determining the position of the light coupler, signals of which are communicated to the control unit, and that the control unit generates corresponding control signals for the actuator, so that the position of the light coupler along at least one axis perpendicular to a tangent of a rotary movement of the two units relative to the light guide, is maintained at a given value.

3. Device according to claim 2, wherein the position of the light coupler along two axes perpendicular to the tangent of the rotary movement of the two units perpendicular to the tangent of the rotary movement of the two units relative to the light guide is maintained at a given value.

4. Device according to claim 2, wherein at least one sensor is an optical, a capacitive, or an inductive sensor.

5. Device according to claim 4, wherein at least one sensor is a differential sensor.

6. Device according to claim 2, wherein at least one reference track is provided to be parallel to the light guide, to be used by the position sensor in determining the position of at least one second light coupler.

7. Device according to claim 2, wherein the actuator is designed to be an electromagnetic suspension means for at least one second light coupler.

8. Device according to claim 1 or 2, wherein the light guide is divided into at least two segments, and means are provided for optical isolation of the segments from each other, lengths of the segments and also directions of propagation of the light in the segments and any supply leads to the segments being designed so that a modulation signal at boundaries between any two segments transmitting a same signal has only minor differences of transit time or phase that are small in comparison with a duration of a period of a modulation signal.

9. Device according to claim 8, wherein groups which each consist of two adjacent segments having a same transit time and an opposite direction of propagation of light are provided.

10. Device according to claim 1 or 2, wherein at least one second light coupler comprises a light guiding fiber, an end of which simultaneously has at least one face serving to deflect light guided in the light guiding fiber at an angle, so that the light can be guided through the fiber.

11. Device according to claim 10, wherein the light guiding fiber is disposed to be approximately perpendicular to a tangent to the light guide, and an angle of deflection of issuing light extends approximately tangentially to the light guide.

12. Device according to claim 10, wherein the light guiding fiber is designed to be simultaneously an optical sensor preferably comprising further faces for deflecting sensor signals in a direction of a contour of the light guide.

13. Device according to claim 12, wherein at least one face is adapted to perform a wavelength-selective deflection or wavelength-selective filtering of sensor signals.

14. Device according to claim 1 or 2, wherein at least one second light coupler is provided for mutually coupling evanescent fields.

15. Device according to claim 14, wherein at least one second light coupler is designed to be a prism.

16. Device according to claim 1 or 2, wherein the light guide comprises at least one reflective boundary surface.

17. Device according to claim 16, wherein the light guide comprises a material having a surface that has been rendered reflective by comprising a reflecting or reflectively coated foil, or a metallic layer deposited by galvanization or vacuum deposition.

18. Device according to claim 16, wherein the boundary surface comprises a reflective multiple layer interference system.

19. Device according to claim 16, wherein the surface is provided with a protective layer.

20. Device according to claim 1 or 2, wherein the light guide is designed to guide a wave along a boundary layer to surrounding air in a similar way to a film wave or surface wave.

21. Device according to claim 1 or 2, wherein the light guide comprises an optical grating for coupling out light.

22. Device according to claim 1 or 2, wherein the light guide comprises a Fresnel structure for coupling out light.

23. Device according to claim 1 or 2, wherein at least one optical transmitter and at least one optical receiver are provided, optionally at least one optical transmitter, or at least one optical receiver being designed to be also a light coupler.

24. Device according to claim 1 or 2, wherein the light guide comprises a surface-coated fiber.

25. Device according to claim 1 or 2, wherein the light guide comprises a tube coated on an outside or inside.

26. Device according to claim 1 or 2, wherein the light guide has collecting properties in at least one plane.

27. Device according to claim 1 or 2, wherein means are provided for a simultaneous transmission of a plurality of channels at different optical wavelengths.

28. Device according to claim 27, wherein a plurality of first light couplers, each provided for coupling in or out a different wavelength, are disposed at different positions of the light guide.

29. Device according to claim 27, wherein means for optical isolation are provided, at least one means for optical isolation being designed to be wavelength selective.

30. Device according to claim 27, wherein a plurality of means for optical isolation are provided and designed to be wavelength selective, and are disposed at appropriate positions for isolating segments of the light couplers for respective wavelengths.

31. Device according to claim 1 or 2, wherein at least one optical transmitter is provided for emitting polarized light, an optical path being designed so that the polarized light is transmitted with a preferred polarization.

32. Device according to claim 31, wherein the polarized light is polarized perpendicularly to the light guide.

33. Device according to claim 1 or 2, wherein at least one polarization-selective optical receiver is provided for receiving light having a predetermined polarization.

34. Device according to claim 1 or 2, wherein a plurality of optical transmitters is provided for emitting polarized light, and a plurality of polarization-selective optical receivers is provided, a plurality of groups consisting of optical transmitters and receivers tuned to each other being formed for simultaneous transmission of a plurality of channels.

35. Device according to claim 1 or 2, wherein at least one optical transmitter is provided for emitting polarized light, and at least one polarization-selective optical receiver is provided, polarization of the polarized light being modulated optionally in the optical transmitter itself or in the signal path for coding a signal to be transmitted, and the optical receiver comprises means for converting the polarization modulation to an amplitude modulation.

36. Device according to claim 2, further comprising:
at least one light-guiding fiber having at least one light exit face;
at least one optical transmitter for coupling optical signals into the light-guiding fiber; and
at least one optical receiver for receiving optical signals from the light-guiding fiber; and
wherein the at least one light-guiding fiber comprises means, assigned to the at least one light exit face, for deflecting light emerging from the light-guiding fiber in a direction that deviates from a longitudinal axis of the light-guiding fiber.

37. Device according to claim 36, wherein the direction that deviates from the longitudinal axis of the light-guiding fiber is perpendicular to the fiber axis.

38. Device according to claim 36, wherein the means for deflecting the light emerging from the light-guiding fiber deflects the light by reflection, or diffraction, or refraction, or dispersion, or a combination thereof.

39. Device according to claim 36, wherein the means for deflecting the light emerging from the light-guiding fiber is designed to be a further face.

40. Device according to claim 39, wherein the further face is arranged to be at such an angle to the longitudinal axis of the light-guiding fiber that the further face reflects back into the fiber at least a portion of the light guided in the light-guiding fiber at such an angle that it emerges from the light-guiding fiber through a wall of the fiber itself or through a light exit face.

41. Device according to claim 39, wherein the further face is arranged to be at such an angle to the longitudinal axis of the light-guiding fiber that at least a portion or the light guided in the light-guiding fiber emerges from the light-guiding fiber at the further face at an angle deviating from the longitudinal axis of the light-guiding fiber.

42. Device according to claim 39, wherein the further face is adapted or coated to be wavelength selective.

43. Device according to claim 42, wherein the further face is adapted or coated to be wavelength-selectively reflective or diffractive or refractive.

44. Device according to claim 36, wherein the at least one light exit face is adapted or coated to be wavelength selective.

45. Device according to claim 44, wherein the at least one light exit face is adapted or coated to be wavelength selectively reflective or diffractive or refractive.

46. Device according to claim 36, wherein at least one optical transmitter and at least one optical receiver are respectively disposed at different ends of the light-guiding fiber.

47. Device according to claim 36, wherein at least one light exit face comprises an active optical coating for wavelength conversion of transmitted light.

48. Device according to claim 47, wherein the active optical coating is adapted for wavelength conversion of transmitted light by non-linear optical effects.

49. Device according to claim 48, wherein the active optical coating is adapted for wavelength conversion of transmitted light by a fluorescent effect.

50. Device according to claim 49, wherein different fluorescence molecules, excited by a common transmitter, are provided for at least two directions.

51. Device for transmitting modulated optical signals between a first unit and a second unit, the first unit being supported for rotary movement relative to the second unit, comprising:
a light guide along a circular track on the first unit;
at least one first light coupler connected to the light guide for coupling light into or out of the light guide;
at least one second light coupler disposed on the second unit and movable relative to the light guide, for coupling light into or out of the light guide; and
wherein the first coupler comprises a first coupling mirror for coupling light into a first light path, and a second coupling mirror for coupling light into a second light path, an optical beam splitter being provided for dividing optical power being delivered by a light source into two preferably equal light beams to feed the first coupler via the first coupling mirror and the second coupling mirror.

52. Device for transmitting modulated optical signals between a first unit and a second unit, the first unit being supported for rotary movement relative to the second unit, comprising:
a light guide along a circular track on the first unit;
at least one first light coupler connected to the light guide for coupling light into or out of the light guide;
at least one second light coupler disposed on the second unit and movable relative to the light guide, for coupling light into or out of the light guide; and
wherein the first coupler comprises a first coupling mirror for coupling light into a first light path, an optical beam splitter being provided to divide optical power being delivered by a light source into two preferably equal light beams to feed a first light beam into the first coupler via a first coupling mirror, and a second light beam directly along the second light path into the first coupler.

53. Device according to claim 51 or 52, wherein the beam splitter comprises structured mirror coatings which are attached, preferably molded or sputtered, to a transparent substrate.

54. Device according to claim 53, wherein the structured mirror coatings have a structure like a grid, a hexagonal pattern, or a random pattern.

55. Device according to claim 51 or 52, wherein the beam splitter comprises a very thin metal layer attached, preferably molded or sputtered, to a transparent substrate.

56. Device according to claim 51 or 52, wherein the beam splitter comprises at least one multi-layer system comprising several layers of metallic and dielectric materials.

57. Device according to claim 56, wherein the layers are arranged on a coplanar slab or on a hypotenuse of a half-cube.

58. Device according to claim 51 or 52, wherein the beam splitter comprises at least one holographic optical element.

59. Device according to claim 51 or 52, wherein the beam splitter comprises optically gratings which are preferably reversible.

60. Device according to claim 51 or 52, wherein the beam splitter comprises an optical switch that is designed to switch light from the light source into a selectable light path where at least one second light coupler is located.

* * * * *